United States Patent [19]

Kiuchi et al.

[11] Patent Number: 5,805,881
[45] Date of Patent: Sep. 8, 1998

[54] METHOD AND APPARATUS FOR GENERATING ARBITRARY OUTPUT RECORDS IN RESPONSE TO OUTPUT DESIGNATION OF RECORDS

[75] Inventors: Hiroyoshi Kiuchi, Hachioji; Tosio Touhara, Oume; Masaaki Fukumura, Iruma, all of Japan

[73] Assignee: Casio Computer Co., Ltd., Tokyo, Japan

[21] Appl. No.: 579,022

[22] Filed: Dec. 18, 1995

Related U.S. Application Data

[63] Continuation of Ser. No. 145,695, Oct. 29, 1993, abandoned.

[30] Foreign Application Priority Data

| Nov. 4, 1992 | [JP] | Japan | 4-317999 |
| Feb. 26, 1993 | [JP] | Japan | 5-061343 |
| Jul. 2, 1993 | [JP] | Japan | 5-188633 |

[51] Int. Cl.⁶ .................................................. G06F 17/30
[52] U.S. Cl. ..................... 395/612; 395/230; 395/235; 395/766; 395/767; 395/770; 395/771
[58] Field of Search .................................. 395/767, 230, 395/235, 612, 766, 770, 771

[56] References Cited

U.S. PATENT DOCUMENTS

| 5,191,522 | 3/1993 | Bosco et al. | 395/204 |
| 5,257,365 | 10/1993 | Powers et al. | 395/600 |
| 5,297,280 | 3/1994 | Potts et al. | 395/600 |
| 5,301,313 | 4/1994 | Terada et al. | 395/600 |
| 5,333,252 | 7/1994 | Brewer, III et al. | 395/767 |
| 5,359,724 | 10/1994 | Earle | 395/425 |
| 5,428,776 | 6/1995 | Rothfield | 395/604 |
| 5,438,664 | 8/1995 | Kashio | 395/767 |
| 5,553,218 | 9/1996 | Li et al. | 395/613 |

OTHER PUBLICATIONS

"A Graphical Knowledge Level Approach for User–Database Interaction", Tan et al., Dept. of Info Science and Comp. Science, IEEE 1990 COMPSAC, Sep. 1990.

*Primary Examiner*—Thomas G. Black
*Assistant Examiner*—Hosain T. Alam
*Attorney, Agent, or Firm*—Frishauf, Holtz, Goodman, Langer & Chick, P.C.

[57] ABSTRACT

In order to obtain an accounting form required by a person who has no expert knowledge, a first designation units designates record names of output records, and item contents (e.g., item codes) of the output records to be extracted, and a second designation units designates item names to be output as data items of the output records, and output object items to be extracted as data items in correspondence with the item names. Then, records which coincide with the designated item contents are read out from a predetermined file, and a processor processes data of the output object items on the basis of the readout records in units of record names of the output records. The processed output records are output in accordance with an arranged order of the record names designated by the first designation units, and data of the output object items of the output records are output in accordance with an arranging order of the item names designated by the second designation units. Therefore, by only designating record names of output records, their item names, output object items and the like in accordance with an output image of, e.g. an accounting form, the accounting form according to the designated contents can be output without generating a code system in advance so as to obtain a desired accounting form.

1 Claim, 30 Drawing Sheets

FIG.2

EXPENSE RESULT TABLE

| EXPENSE ITEM | | INITIAL PLAN | REVISED PLAN | RESULT | | TOTAL RESULT | PLAN DIFFERENCE |
|---|---|---|---|---|---|---|---|
| | | | | DEPARTMENT EXPENSE | TRANSFER EXPENSE | | |
| TOTAL | | 2,000,000 | 1,800,000 | | | | |
| FIXED EXPENSE | | 1,200,000 | 1,100,000 | | | | |
| | PERSONNEL EXPENSE | 1,000,000 | 900,000 | | | | |
| | OTHERS | 200,000 | 200,000 | | | | |
| VARIABLE EXPENSE | | 800,000 | 700,000 | | | | |
| | TRAVEL AND TRANSPORTATION EXPENSE | 400,000 | 300,000 | | | | |
| | STATIONERY EXPENSE | 300,000 | 250,000 | | | | |
| | OTHERS | 100,000 | 150,000 | | | | |

FIG.3

| | ACCUMULATION LEVEL | | | | | | PLAN FILE BUDGET ITEM | | | ACCOUNTING FILE ACCOUNT TITLE | | | |
|---|---|---|---|---|---|---|---|---|---|---|---|---|---|
| | A | B | C | D | E | F | | | | | | | |
| 01 | TOTAL | | | | | | | | | | | | |
| 02 | | FIXED EXPENSE | | | | | | | | | | | |
| 03 | | | PERSONNEL EXPENSE | ○ | | | 101 | 102 | | 2111 | 2112 | 2134 | |
| 04 | | | OTHERS | ○ | | | 412 | | | 4111 | 4121 | | |
| 05 | | VARIABLE EXPENSE | | | | | | | | | | | |
| 06 | | | TRAVEL AND TRANSPORTATION EXPENSE | ○ | | | 410 | | | 4201 | 4202 | | |
| 07 | | | STATIONERY EXPENSE | ○ | | | 551 | 552 | | 4325 | | | |
| 08 | | | OTHERS | ○ | | | 611 | | | 4321 | | | |

FIG. 4

| A | B | C | D | E | F | G |
|---|---|---|---|---|---|---|
| | | | RESULT | | | |
| EXPENSE ITEM | INITIAL PLAN | REVISED PLAN | DEPARTMENT EXPENSE | TRANSFER EXPENSE | TOTAL RESULT | PLAN DIFFERENCE |
| FORMAT | #,###,##0 | #,###,### | #,###,### | #,###,### | #,###,##0 | #,##0 |
| OBJECT FILE | PLAN FILE | PLAN FILE | ACCOUNTING FILE | ACCOUNTING FILE | | |
| ACCUMULATION ITEM | BUDGET AMOUNT + | BUDGET AMOUNT + | CREDIT AMOUNT +<br>DEBIT AMOUNT - | CREDIT AMOUNT +<br>DEBIT AMOUNT - | D+E | C-F1 |
| CALCULATION FORMULA | B/1000 | C/1000 | D/1000 | E/1000 | F1/1000 | G2/1000 |
| CONDITION ITEM | PLAN TYPE | PLAN TYPE | CORRESPONDING ACCOUNT | CORRESPONDING ACCOUNT | | |
| CONDITION VALUE | 1 | 2<br>3<br>4 | ≠ 0011 | 0011 | | |

FIG.5A

| FILENAME | SEQ | ITEM NAME | FILE SYMBOL |
|---|---|---|---|
| PLAN FILE | 01 | BUDGET ITEM | 1 |
| ACCOUNTING FILE | 01 | ACCOUNT TILE | 2 |

FIG.5B

| FILENAME | SEQ | ITEM NAME | FILE SYMBOL |
|---|---|---|---|
| PLAN FILE | 01 | PLAN TYPE | 1 |
| ACCOUNTING FILE | 01 | CORRESPONDING ACCOUNT | 2 |

FIG.5C

| FILE NAME | POSITION | CONDITION VALUE | DENY FLG |
|---|---|---|---|
| PLAN FILE | B | 1 | |
| PLAN FILE | C | 2 | |
| PLAN FILE | C | 3 | |
| PLAN FILE | C | 4 | |
| ACCOUNTING FILE | D | 0011 | 1 |
| ACCOUNTING FILE | E | 0011 | |

FIG.5D

| FILE NAME | POSITION | ITEM NAME | MINUS SIGN |
|---|---|---|---|
| PLAN FILE | B | BUDGET AMOUNT | |
| PLAN FILE | C | BUDGET AMOUNT | |
| ACCOUNTING FILE | D | CREDIT AMOUNT | |
| ACCOUNTING FILE | D | DEBIT AMOUNT | 1 |
| ACCOUNTING FILE | E | CREDIT AMOUNT | |
| ACCOUNTING FILE | E | DEBIT AMOUNT | 1 |

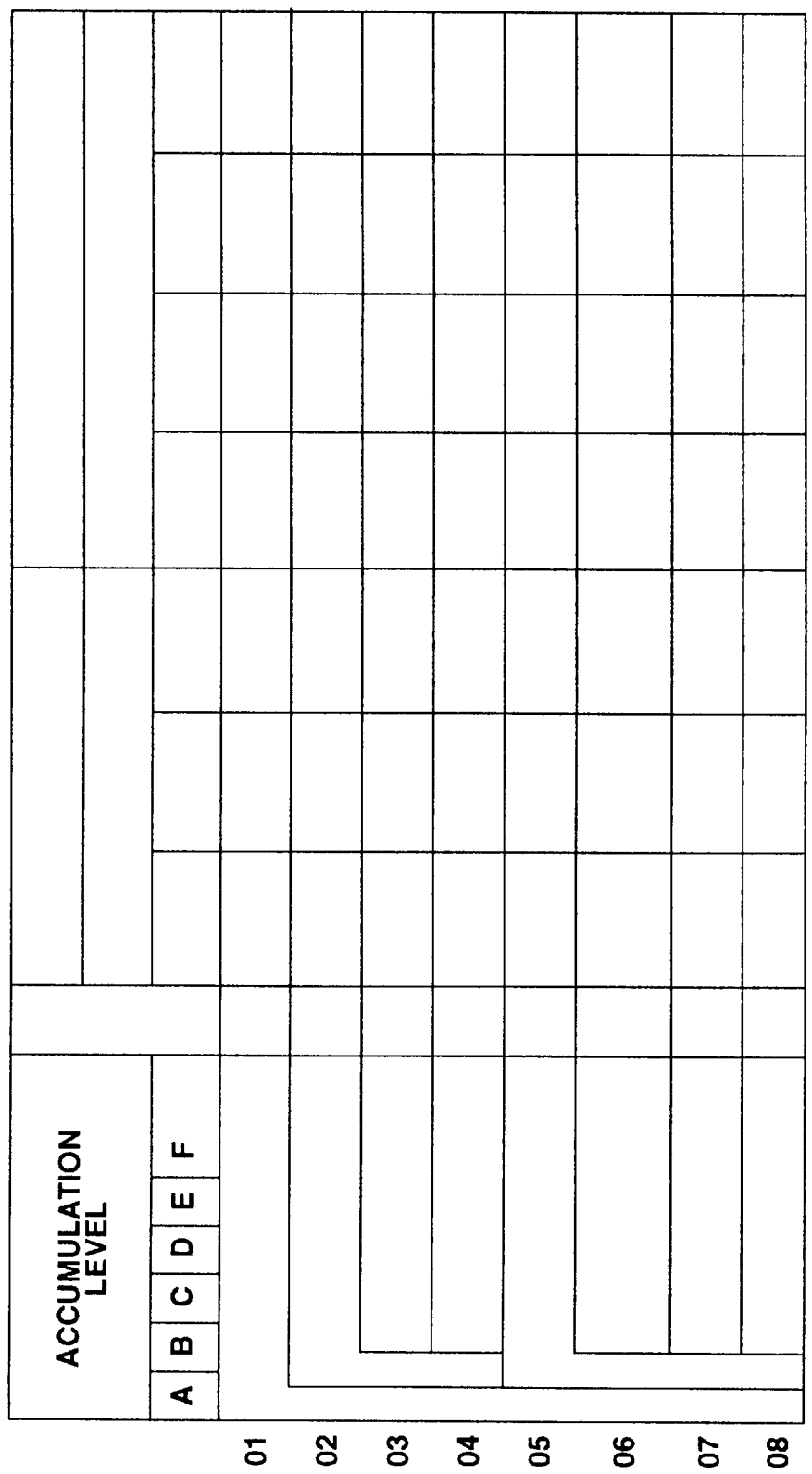

FIG.7

| A | B | C | D | E | F | G |
|---|---|---|---|---|---|---|
| FORMAT | | | | | | |
| OBJECT FILE | | | | | | |
| ACCUMULATION ITEM | | | | | | |
| CALCULATION FORMULA | | | | | | |
| CONDITION ITEM | | | | | | |
| CONDITION VALUE | | | | | | |

FIG.13A

| CHILD CODE | PARENT CODE | END FLAG | NAME |
|---|---|---|---|
| ·B02 | ·A01 | 1 | TOTAL |

FIG.13B

| LEVEL ROW | A | B | C | D |
|---|---|---|---|---|
| | A01 | B02 | C03 | |
| NAME | TOTAL | FIXED EXPENSE | PERSONNEL EXPENSE | |

FIG.13C

| CHILD CODE | PARENT CODE | END FLAG | NAME |
|---|---|---|---|
| 1101 | ·C03 | | PERSONNEL EXPENSE |

FIG.14

| CHILD CODE | PARENT CODE | END FLAG | NAME |
|---|---|---|---|
| ·B02 | ·A01 | 1 | TOTAL |
| ·B05 | ·A01 | 1 | TOTAL |
| ·C03 | ·B02 | | FIXED EXPENSE |
| ·C04 | ·B02 | | FIXED EXPENSE |
| ·C06 | ·B05 | | VARIABLE EXPENSE |
| ·C07 | ·B05 | | VARIABLE EXPENSE |
| ·C08 | ·B05 | | VARIABLE EXPENSE |
| 1101 | ·C03 | | PERSONNEL EXPENSE |
| 1102 | ·C03 | | PERSONNEL EXPENSE |
| 1410 | ·C06 | | TRAVEL AND TRANSPORTATION EXPENSE |
| 1412 | ·C04 | | OTHERS |
| 1551 | ·C07 | | STATIONERY EXPENSE |
| 1552 | ·C07 | | STATIONERY EXPENSE |
| 1611 | ·C08 | | OTHERS |
| 22111 | ·C03 | | PERSONNEL EXPENSE |
| 22112 | ·C03 | | PERSONNEL EXPENSE |
| 22134 | ·C03 | | PERSONNEL EXPENSE |
| 24111 | ·C04 | | OTHERS |
| 24121 | ·C04 | | OTHERS |
| 24201 | ·C06 | | TRAVEL AND TRANSPORTATION EXPENSE |
| 24202 | ·C06 | | TRAVEL AND TRANSPORTATION EXPENSE |
| 24321 | ·C08 | | TRAVEL AND TRANSPORTATION EXPENSE |
| 24325 | ·C07 | | STATIONERY EXPENSE |
| | | | |

FIG.19

(SOURCE) PLAN FILE

| | BUDGET ITEM | BUDGET AMOUNT | | PLAN TYPE |
|---|---|---|---|---|
| ----- | 101 | 800,000 | ----- | 1 |
| ----- | 102 | 200,000 | ----- | 1 |
| ----- | 103 | 400,000 | ----- | 2 |
| ----- | 104 | 50,000 | ----- | 2 |

DEVELOPMENT RECORD (CLASSIFICATION KEY)

| | A | B | C | D | E |
|---|---|---|---|---|---|
| FIRST RECORD | 1 \| 101 | 800,000 | | | |
| SECOND RECORD | 1102 | 200,000 | | | |
| THIRD RECORD | 1103 | | 400,000 | | |
| FOURTH RECORD | 1104 | | 50,000 | | |

FIG.20

(SOURCE) ACCOUNTING FILE

| | ACCOUNT TITLE | | CREDIT AMOUNT | DEBIT AMOUNT | CORRES-PONDING ACCOUNT |
|---|---|---|---|---|---|
| FIRST RECORD | 2111 | | 50,000 | 0 | 0011 |
| SECOND RECORD | 2111 | | 0 | 40,000 | 0011 |
| THIRD RECORD | 2112 | | 800,000 | 0 | 0010 |

(CLASSIFICATION KEY)

| | A | | B | C | D | E |
|---|---|---|---|---|---|---|
| FIRST RECORD | 2 | 2111 | | | | 50,000 |
| SECOND RECORD | 2 | 2111 | | | | -40,000 |

↓ COMBINE RECORDS OF SAME KEY
(50,000−40,000=10,000)

| | A | | B | C | D | E |
|---|---|---|---|---|---|---|
| COMBINED RECORD | 2 | 2111 | | | | 10,000 |
| THIRD RECORD | 2 | 2112 | | | 800,000 | |

FIG.21

|  | A | B | C | D | E | F |
|---|---|---|---|---|---|---|
|  | 1101 | 800,000 |  |  |  |  |
|  | 1102 | 200,000 |  |  |  |  |
|  | 1103 |  | 400,000 |  |  |  |
|  |  |  |  |  |  |  |
|  | 22111 |  |  |  | 10,000 |  |
|  | 22112 |  |  | 300,000 |  |  |
|  |  |  |  |  |  |  |
| NEWLY GENERATED | ·C03 | 800,000 |  |  |  |  |
|  |  |  |  |  |  |  |

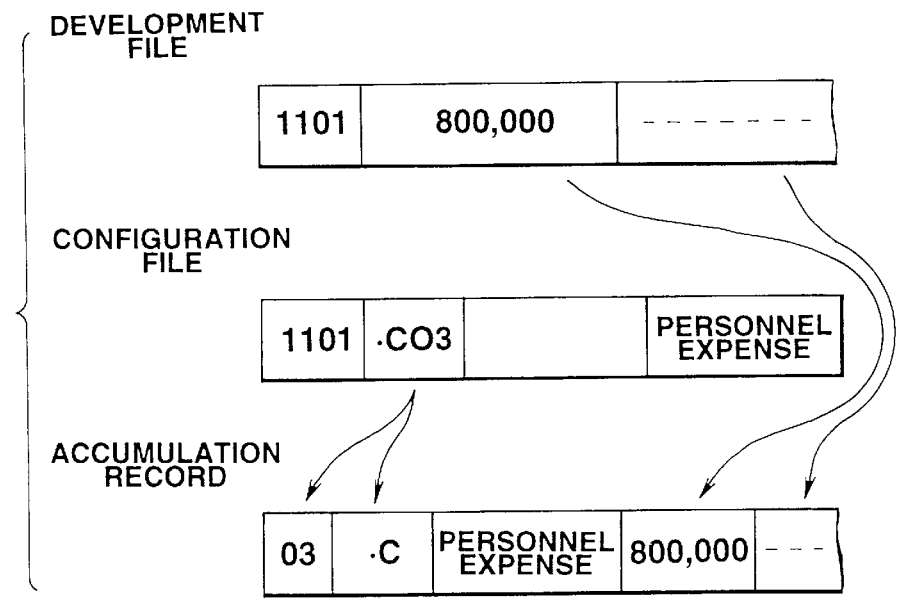

FIG.24

| | | PLAN FILE | | ACCOUNTING FILE | |
|---|---|---|---|---|---|
| | ACCUMULATION LEVEL | ITEM NAME | CONDITION VALUE | ITEM NAME | CONDITION VALUE |
| 01 TOTAL | A | | | | |
| 02 FIXED EXPENSE | B | | | | |
| 03 PERSONNEL EXPENSE | C | BUDGET ITEM | 101,102 | ACCOUNT TITLE | 2111,2112,2134 |
| 04 OTHERS | C | BUDGET ITEM | 412 | ACCOUNT TITLE | 4111,4121 |
| 05 VARIABLE EXPENSE | B | | | | |
| 06 TRAVEL AND TRANSPORTATION EXPENSE | C | BUDGET ITEM | 410 | ACCOUNT TITLE | 4201,4202 |
| 07 STATIONERY EXPENSE | C | BUDGET ITEM | 551,552 | ACCOUNT TITLE | 4325 |
| 08 OTHERS | C | BUDGET ITEM | 611 | ACCOUNT TITLE | 4321 |
| 09 ENTERTAINMENT EXPENSE | | MISCELLANEOUS ITEM | 812 | ACCOUNT TITLE | 4203 |

SALES MANAGEMENT TABLE (SALES DEPT.)

| | | GROSS SALES | SALES ALLOWANCES | SALES RETURNS | NET SALES AMOUNT | SALES/ RETURNS RATIO |
|---|---|---|---|---|---|---|
| AUDIO | DOMESTIC | 523 658 | 568 | 1 880 | 512 210 | 0.36 |
| | | 235 299 | 535 | 108 | 234 627 | 0.05 |
| | EXPORT | 288 387 | 33 | 1 772 | 286 582 | 0.61 |
| | EUROPE | 192 996 | 15 | 1 152 | 191 829 | 0.60 |
| | USA | 96 391 | 18 | 620 | 94 753 | 0.65 |
| VIDEO | | 1 568 365 | 1 256 | 4 358 | 1 562 751 | 0.28 |
| | DOMESTIC | 859 781 | 658 | 3 875 | 855 248 | 0.45 |

FIG.27

| ACCUMULATION LEVEL | | | ITEM | DESTINATION |
|---|---|---|---|---|
| A | B | C | | |
| AUDIO | | | 10 | 99 |
| | DOMESTIC | | 10,14,15 | 00 |
| | EXPORT | | 10,14,15 | 04,99 |
| | | EUROPE | 10,14,15 | 02 |
| | | USA | 10,14,15 | 03 |
| VIDEO | | | | |
| | DOMESTIC | | 10,16,99 | 00 |
| ~ | | | | |
| TOTAL | | | | |
| | DOMESTIC | | 10,11,12,13,14,15,16~99 | 00 |
| | EXPORT | | | |
| | | EUROPE | 10,11,12,13,14,15,16~99 | 02 |
| | | USA | 10,11,12,13,14,15,16~99 | 03 |
| | | OTHERS | 10,11,12,13,14,15,16~99 | 04,99 |

FIG.28

| Accumulation Level | Name | RADIO 10 | TELEVISION 11 | REFRIGERATOR 12 | AIR CONDITIONER 13 | STEREO 14 | RADIO CASSETTE RECORDER 15 | VIDEO 16 | ⁓ | OTHERS 99 | DOMESTIC 00 | EUROPE 02 | USA 03 | ASIA 04 | ⁓ | OTHERS 99 |
|---|---|---|---|---|---|---|---|---|---|---|---|---|---|---|---|---|
| 1 | AUDIO | ○ | | | | ○ | ○ | | | | ○ | ○ | ○ | ○ | | |
| 2 | DOMESTIC | ○ | | | | ○ | ○ | | | | ○ | | | | | |
| 2 | EXPORT | ○ | | | | ○ | ○ | | | | | ○ | ○ | ○ | | |
| 3 | EUROPE | ○ | | | | ○ | ○ | | | | | ○ | | | | |
| 3 | USA | | | | | | | | | | | | ○ | | | |
| 1 | VIDEO | | ○ | | | | | ○ | | ○ | ○ | ○ | ○ | ○ | | ○ |
| 2 | DOMESTIC | | ○ | | | | | ○ | | ○ | ○ | | | | | |
| ⁓ | | | | | | | | | | | | | | | | |
| 1 | TOTAL | ○ | ○ | ○ | ○ | ○ | ○ | ○ | | ○ | ○ | ○ | ○ | ○ | | ○ |
| 2 | DOMESTIC | ○ | ○ | ○ | ○ | ○ | ○ | ○ | | ○ | ○ | | | | | |
| 2 | EXPORT | ○ | ○ | ○ | ○ | ○ | ○ | ○ | | ○ | | ○ | ○ | ○ | | ○ |
| 3 | EUROPE | ○ | | | | | | | | | | ○ | | | | |
| 3 | USA | | | | | | | | | | | | ○ | | | |
| 3 | OTHERS | ○ | | | | | | | | ○ | | | | ○ | | ○ |

FIG.29

| ACCUMULATION LEVEL | | | | ITEM | | | | | | | | DESTINATION | | | | |
|---|---|---|---|---|---|---|---|---|---|---|---|---|---|---|---|---|
| A | B | C | D | RADIO 10 | TELEVISION 11 | REFRIGERATOR 12 | AIR CONDITIONER 13 | STEREO 14 | RADIO CASSETTE RECORDER 15 | VIDEO 16 | ~ | OTHERS 99 | DOMESTIC 00 | EUROPE 02 | USA 03 | ASIA 04 | ~ | OTHERS 99 |
| AUDIO DOMESTIC | ○ | | | | ○ | ○ | | | | | ○ | | | |
| EXPORT EUROPE | ○ | | | | ○ | ○ | | | | | ○ | | |
| USA | ○ | | | | ○ | ○ | | | | | | ○ | |
| VIDEO DOMESTIC | | ○ | | | | | ○ | | ○ | | | | |
| ~ | | | | | | | | | | | | | |
| TOTAL DOMESTIC | ○ | ○ | ○ | ○ | ○ | ○ | ○ | | ○ | | | | |
| EXPORT EUROPE | ○ | ○ | ○ | ○ | ○ | ○ | ○ | | | ○ | | | |
| USA | ○ | ○ | ○ | ○ | ○ | ○ | ○ | | | | ○ | | |
| OTHERS | ○ | ○ | ○ | ○ | ○ | ○ | ○ | | | | | ○ | ○ |

FIG. 30

| ACCUMULATION LEVEL | | PORTABLE ELECTRONIC CALCULATION | | | | TIMEPIECE | | ~ | TOTAL | | | |
|---|---|---|---|---|---|---|---|---|---|---|---|---|
| | | Domestic | Export Europe | Export USA | | Domestic | ~ | | Domestic | Export Europe | Export USA | Others |
| ITEM | RADIO 10 | O | O | O | O | | | | O | O | O | O |
| | TELEVISION 11 | | | | | | O | | | O | O | O | O |
| | REFRIGERATOR 12 | | | | | | | | | O | O | O | O |
| | AIR CONDITIONER 13 | | | | | | | | | O | O | O | O |
| | STEREO 14 | O | O | O | O | | | | | O | O | O | O |
| | RADIO CASSETTE RECORDER 15 | O | O | O | O | | | | | O | O | O | O |
| | VIDEO 16 | | | | | | O | | | O | O | O | O |
| | ~ | | | | | | | | | | | | |
| | OTHERS 99 | | | | | | O | | | O | O | O | O |
| DESTINATION | DOMESTIC 00 | O | | | | | O | | | O | | | |
| | EUROPE 02 | | O | | | | | | | | O | | |
| | USA 03 | | | O | | | | | | | | O | |
| | ASIA 04 | O | | | | | | | | | | | O |
| | ~ | | | | | | | | | | | | |
| | OTHERS 99 | | O | | | | | | | | | | O |

Accumulation Level: A — B — C — D

METHOD AND APPARATUS FOR GENERATING ARBITRARY OUTPUT RECORDS IN RESPONSE TO OUTPUT DESIGNATION OF RECORDS

This application is a Continuation of application Ser. No. 08/145,695, filed Oct. 29, 1993, now abandoned.

BACKGROUND OF THE INVENTION

1. Field of the Invention

The present invention relates to a data processing apparatus for processing record data from an accounting file, a personnel file, and the like in an office computer, a personal computer, etc.

2. Description of the Related Art

Conventionally, an office work processing apparatus such as an office computer, a versatile computer, and the like stores and manages a variety of files such as accounting files, personnel files, sales slip files, stock files, etc. However, a record structure constituting each file varies in units of files, and files are stored and managed in units of those having the same record formats (i.e., records which are constituted by the same items).

When an arbitrary item is designated to read out records including the designated item, and the readout records are classified and accumulated, even if a classification code system, which allows easy classification/accumulation of data in items, is initially created, classifications tend not to match the reality as time passes, and will disable classification/accumulation unless they are modified.

Thus, the conventional apparatus popularly adopts the following classification/accumulation method at present. That is, a code conversion table for classification/accumulation is provided as a counter-measure against the above-mentioned problem, and the code system is converted into one that is optimal for classification/accumulation using the code conversion table.

However, in the method using the code conversion table; a system engineer, as an expert, must create a code system (conversion table) for classification/accumulation. More specifically, since creation of a classification code system in correspondence with various business requirements requires highly sophisticated, advanced knowledge, it is difficult for an office clerk as a normal user to create such a system, and the user must ask a system engineer to create the system.

It is an object of the present invention to provide a data processing apparatus, which can output books, slips, and the like (to be referred to as an accounting form hereinafter), according to a designated content, by designating only record names of output records, items to be output, and the like in accordance with an output image of, e.g., an accounting form without creating a code system in advance so as to obtain the desired accounting form, and the like.

SUMMARY OF THE INVENTION

According to the present invention, there is provided a data processing apparatus comprising:

first designation means for designating record names and item contents of output records to be extracted in correspondence with an arranged order of output records;

second designation means for designating, in correspondence with the arranged order of data items, item names output as data items of the output records, and output object items extracted as data items in correspondence with the item names;

read-out means for reading out records from a predetermined file in accordance with the item contents designated by the first designation means;

processing means for processing data of the output object items, designated by the second designation means, in units of record names of the output record designated by the first designation means on the basis of the records read out by the read-out means; and output means for outputting the output records processed by the processing means in accordance with the arranged order of the record names designated by the first designation means, and for outputting the data of the output object items of the output records in accordance with the arranged order of the item names designated by the second designation means.

According to the present invention, since an accounting form, or the like, according to a designated content, can be output by designating only record names of records and items to be output, etc, in accordance with an output image of, e.g. the accounting form, without creating a code system in advance in order to obtain a desired accounting form, etc; a user need not, therefore, ask for an expert such as a system engineer, to create a code system; unlike in the conventional apparatus, and, consequently, an office clerk, as a normal user; can easily obtain a desired accounting form or the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 2 is a view showing a print-out sample of an accounting form;

FIG. 3 is a table showing the details of the content defined in a table A;

FIG. 4 is a table showing the details of the content defined in a table B;

FIGS. 5A to 5D show the details of the contents of various tables obtained by analyzing the tables A and B shown in FIGS. 3 and 4, in which FIG. 5A shows a table A coupling table, FIG. 5B shows a table B coupling table, FIG. 5C shows a table B condition table and FIG. 5D shows a table B accumulation item table;

FIG. 6 shows the basic format of the table A;

FIG. 7 shows the basic format of the table B;

FIGS. 13A to 13C show the details of the operation content of the configuration file generation processing, in which FIGS. 13A and 13C show the contents of a configuration record, and FIG. 13B shows the content of a final item work memory;

FIG. 14 is a table showing the detailed content of a configuration file;

FIG. 19 shows generated development records based on the record content of a plan file;

FIG. 20 shows generated development records based on the record content of an accounting file;

FIG. 21 is a table showing the details of the content of a development file 11;

FIGS. 23A and 23B show the details of the operation content of the development accumulation processing, in which FIG. 23A shows a state wherein an accumulation record is generated based on a development file and a configuration file, and FIG. 23B shows a newly generated development record;

FIG. 24 shows another embodiment of the table A;

FIG. 25 shows still another embodiment of the table A;

FIG. 26 shows a printed accounting form; and

FIGS. 27 to 30 show other embodiments of the table A.

DETAILED DESCRIPTION OF THE PREFERRED EMBODIMENT

An embodiment of the present invention will be described hereinafter with reference to FIGS. 1 to 24.

Figure 1:
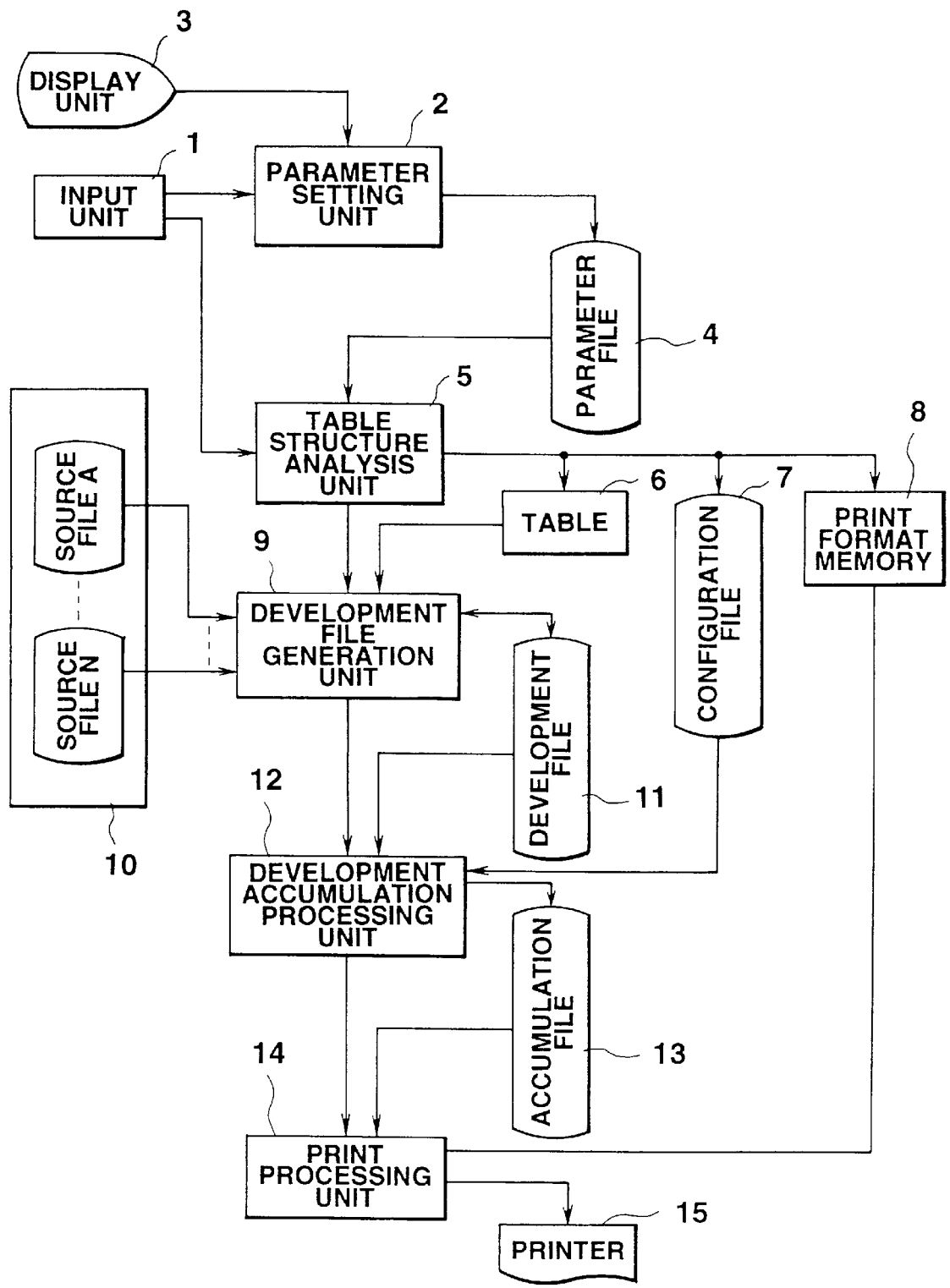
FIG. 1 is a block diagram of a data processing apparatus according to an embodiment of the present invention.

FIG. 1 is a block diagram showing a data processing apparatus according to this embodiment. The data processing apparatus constitutes an office computer. When, e.g., an office clerk having no expert knowledge arbitrarily designates accumulation objects in units of accumulation levels using an accumulation definition table, the apparatus reads out records corresponding to the definition content of the accumulation definition table from predetermined files, accumulates the readout records in a hierarchical structure according to the accumulation level, and prints out the accumulation result as accounting form data.

An input unit 1 is a key input device used for inputting various data, commands, and the like. Data input from the input unit 1 is fetched and processed by a parameter setting unit 2, and is displayed on a display unit 3. Note that the input unit 1 supplies a start command to the parameter setting unit 2 in response to a predetermined key operation.

The parameter setting unit 2 operates in response to the start command from the input unit 1; generates definition tables (two different tables, i.e., tables A and B in this embodiment) for defining record names of accumulation records, accumulation objects, or an accumulation condition in accordance with data input from the input unit 1 so as to instruct the arbitrary record accumulation desired by; e.g., an office clerk; displays the generated tables on the display unit 3, and sets the tables in a parameter file 4. The tables A and B will be briefly described below since they will be described in detail later. For example, in order to print out an "expense result table", shown in FIG. 2 as a desired accounting form, the tables A and B are generated as accumulation definition tables according to an output image of this accounting form. In the accounting form shown in FIG. 2, record names of accumulation records are arranged in row items, and data item names of the accumulation records are arranged in column items. Table A has a configuration shown in FIG. 3, and table B has a configuration shown in FIG. 4. Table A is a definition table for defining the record names of the accumulation records, item contents extracted as the accumulation records, and the like in units of accumulation levels. Table B is a definition table for defining the item names output as data items of the accumulation records; and items to be output extracted as data items in correspondence with the item names, or a format, an accumulation condition and the like in an accounting form print mode.

The parameter file 4 stores permanent basic formats (e.g., ruled line data) in correspondence with the tables A and B upon manufacture of the apparatus; and also stores table A and B parameter data of various accounting forms, which are input from the input unit 1, and correspondence tables for causing various accounting form names, arbitrarily input from the input unit 1, to correspond to the table A and B parameter data.

A table structure analysis unit 5 operates in accordance with the start command input from the input unit 1 in the accounting form print mode, and analyzes table A and B parameter data corresponding to an accounting form name arbitrarily designated as an object to be output, thereby generating various parameter analysis tables 6 in accordance with the analysis result. In this case, according to this embodiment, as the parameter analysis tables 6, a table A coupling table (FIG. 5A), a table B coupling table (FIG. 5B), a table B condition table (FIG. 5C), a table B accumulation item table (FIG. 5D), and a table B calculation formula table (not shown) are generated. The table structure analysis unit 5 analyzes a hierarchical structure or the like corresponding to the accumulation levels defined in the table A, and generates a configuration file 7 on the basis of the analysis result. Furthermore, the table structure analysis unit 5 reads out item names (e.g., "expense item", "initial plan", and the like) of respective columns defined at the header position of the table B, and sets the readout names in a print format memory 8. Also, the analysis unit 5 reads out print formats of respective columns defined at the format position of the table B, and sets the readout formats in the print format memory 8. Thereafter, the table structure analysis unit 5 supplies a start command to a development file generation unit 9.

The development file generation unit 9 refers to various table contents in the parameter analysis tables 6; designates accumulation object files from various source files A, . . . , N constituting a data file 10, sequentially generates development records one by one on the basis of records extracted from the accumulation object files, and stores the development records in a development file 11. Upon generation of the development file 11, the development file generation unit 9 supplies a start command to a development accumulation processing unit 12.

The development accumulation processing unit 12 sequentially generates accumulation records one by one, on the basis of the content of the development file 11 while referring to the configuration file 7, and stores the generated records in an accumulation file 13. Upon generation of the accumulation file 13, the development accumulation processing unit 12 supplies a start command to a print processing unit 14.

The print processing unit 14 causes a printer 15 to print out the content of the accumulation file 13, record by record, together with an accounting form format in accordance with a print format set in the print format memory 8, thereby generating an accounting form.

The operation of this embodiment will be described below.

First, when an office clerk instructs generation of the tables A and B using the input unit 1 so as to obtain a desired accounting form, the parameter setting unit 2 operates in response to this instruction. Upon generation of the table A, the parameter setting unit 2 causes the display unit to display a table frame, and the like, in accordance with the basic format of the table A, read out from the parameter file 4. FIG. 6 shows the display state of the basic format of the table A. In the basic format of the table A, letters A, B, C, D, E and F representing six accumulation levels, and a bracketing ruled line format, for dividing the accumulation levels, are displayed as index portions in the row direction. The bracketing ruled lines are displayed to be "offset" in the column direction, in units of accumulation levels, and these offsets represent the hierarchical structure of the accumulation levels. The hierarchical structure in this case has a relationship of A>B>C>D>E>F. In this case, record names of accumulation records are input to row items of the table A in correspondence with the accumul ation levels; and file names of accumulation objects, and item names, to be extracted as accumulation records from the files are input to the column direction. Note that the basic format of the table A can be partially modified, and the entire table frame can be expanded or reduced.

In a state wherein the basic format of the table A is being displayed, an office clerk inputs parameter data of the table A using the input unit 1. FIG. 3 shows a display example obtained when the parameter data are input to the table A. Referring to FIG. 3, in the index portions in the row direction of the table A, arbitrary names are input as record names of accumulation records in correspondence with the accumulation levels. For example; a record name "total" is input to row No. "01" in correspondence with the accumulation level A, a record name "fixed expense" is input to row No. "02" in correspondence with the accumulation level B; a record name "personnel expense", is input to row No. "03" in correspondence with the accumulation level C, . . . In the above-mentioned example, arbitrary record names are directly input from the input unit 1 in units of accumulation levels. However, when record names to be used are determined beforehand, record names to be used may be stored in a table. When record names are input, the table content may be displayed as a list on a window screen, and arbitrary record names may be selected from the list to input the record names. Note that record names are not limited to names but may also be codes.

Also, arbitrary file names and item names are input to the index portions in the column direction of the table A. For example, in the table A shown in FIG. 3, two file names "plan file" and "accounting file" are input, thereby defining object file names, i.e., from which files accumulation records are to be extracted. An item name "budget item" is input in correspondence with the file name "plan file", and an item name "account title" is input in correspondence with the file name "accounting file", thereby defining object item names to be extracted as accumulation records.

Furthermore, in input areas in a matrix defined by the index portions in the row and column directions of the table A, detailed item contents (item codes) of accumulation object items are input. For example, as for row No. "03", i.e., the record name "personnel expense" corresponding to the accumulation level C; item codes "101" and "102" are input in correspondence with "budget item" of "plan file", and item codes "2111", "2112" and "2134" are input in correspondence with the "account title" of "accounting file". With these codes, it is acted to extract records corresponding to the item codes "101" and "102" from budget items constituting the plan file, and it is also acted to extract records corresponding to the item codes "2111", "2112", and "2134" from account items constituting the accounting file.

Table A has management unit areas corresponding with row Nos., and when an arbitrary row is designated, and a circular mark is input at the corresponding position, it indicates that the corresponding row is an area where an item code is input. This is to increase the processing speed since rows with circular marks are analyzed, and other rows are not analyzed. At the same time, such marks function to cause an office clerk to confirm that data to be extracted and accumulated are present in source files (e.g., the accounting file, and the like). In table A shown in FIG. 3, two file names are input. However, three or more file names may be input. Also, one item name is input in correspondence with one file name. However, two or more item names may be input in correspondence with one file name.

When table A is generated in this manner, the parameter setting unit 2 sets the parameter data in the parameter file 4.

Then, the parameter setting unit 2 reads out the basic format of table B from the parameter file 4, and displays it on the display unit. FIG. 7 shows the basic format of table B. In index portions in the row direction of table B; "format", "object file", "accumulation item", "calculation formula", "condition item" and "condition value" are permanently set as labels of row items, and respective column items in index portions, in the column direction, of table B are correspondingly assigned "A", "B", "C", . . . , "G" as names representing their item positions. Note that the basic format of the table B can be partially modified as in table A, and the entire table frame can be expanded or reduced.

In a state wherein the basic format of table B is being displayed, an office clerk inputs parameter data of table B from the input unit 1. FIG. 4 shows a display example obtained when the parameter data are input to the table B. Referring to FIG. 4, item names to be printed out as data items of accumulation records are input to the index portions in the column direction of table B. For example; "expense item" is input at the item position "A", "initial plan" is input at the item position "B"; "revised plan" is input at the item position "C", "result" is input at the item positions "D" and "E" as a common item; "departmental expense" is input at the item position "D" as a lower-order item of "result", "transfer expense" is input at the item position "E"; "total result" is input at the item position "F" and "plan difference" is input at the item position "G".

In the item "format" in row items of table B; column width, character type, character size, and the like are input as a print format of item data in units of column items. In the next item "object file", "plan file" is input in correspondence with the column item positions "B" and "C". Furthermore, the next item "accumulation item" defines item data to be accumulated from records extracted as accumulation objects. More specifically; "budget amount+" is input in correspondence with the column item positions "B" and "C", and "debit amount+" and "credit amount−" are input in correspondence with the column item positions "D" and "E". The next item "calculation formula" is used for inputting an output unit upon outputting an accumulation result, and calculation formulas for accumulation calculations. The illustrated example "B/1000" represents that the content of the data item B is divided by "1,000", and is output in units of 1,000 yen. On the other hand, "condition item" and "condition value" act that only records, whose item data correspond to a predetermined value, of extracted records, extracted according to the definition content of the table A, are accumulated as accumulation objects. As "condition item", "plan type" is input at the column item positions "B" and "C". As "condition value" of these items, "1" is input at the column item position "B", and "2", "3" and "4" are input at the column item position "C". Similarly, "corresponding account" is input as "condition item" at the column item positions "D" and "E". In addition, as "condition value" of these items, "≠0011 (it indicates that all codes except for 0011 are to be extracted)" is input at the column item position "D", and "0011" is input at the column item position "E". Note that "expense result table" is input as an accounting form name at a position outside the table frame of table B.

When the table B is generated in this manner, the parameter setting unit 2 sets the parameter data in the parameter file 4.

Figure 8:
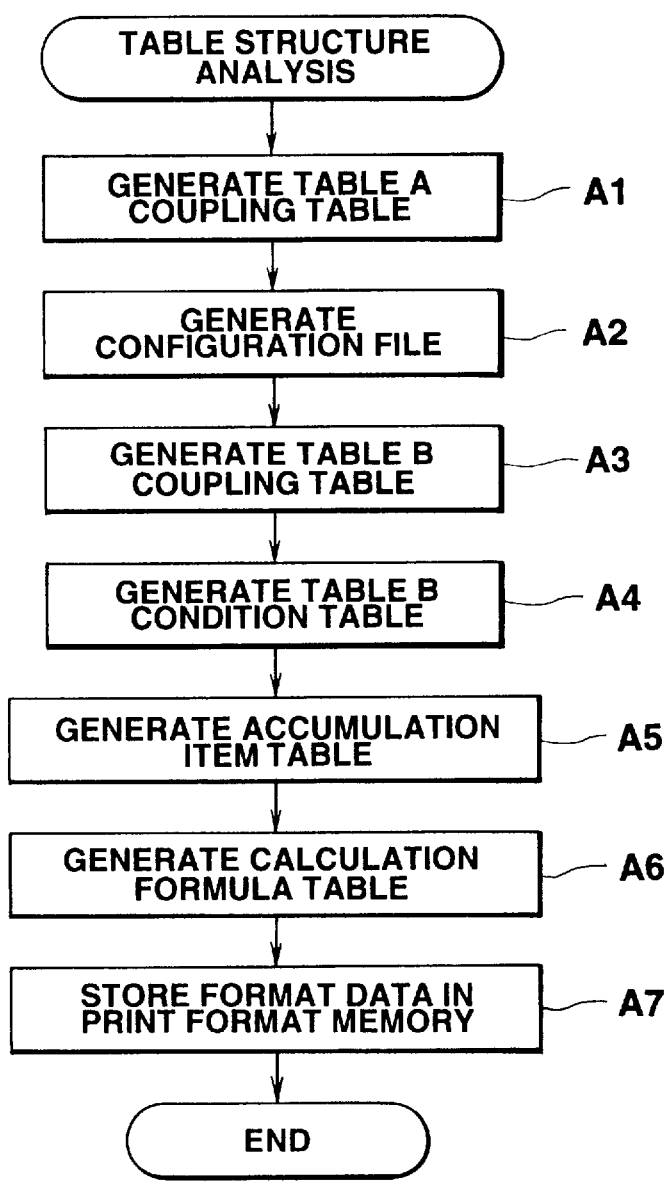
FIG. 8 is a general flow chart showing the overall operation of a table structure analysis unit 5.

After tables A and B are generated in this manner, when an office clerk designates an arbitrary accounting form name, using the input unit 1 to issue a print command of the accounting form, the table structure analysis unit 5 operates according to the flow chart shown in FIG. 8. Note that FIG. 8 is a general flow chart showing the outline of the overall operation of the table structure analysis unit 5. First, the table structure analysis unit 5 reads out the table A parameter data of the designated accounting form from the parameter file 4, to generate the table A coupling table (step A1), and generates a configuration file (step A2). Following that, the table structure analysis unit 5 reads out the table B parameter data of the designated accounting form from the parameter file 4, to generate the table B coupling table (step A3), and generates the condition table (step A4), the accumulation item table (step A5), and the calculation formula table (step A6). Thereafter, the unit 5 extracts data associated with the format from the table B parameter data, and stores the extracted format data in the print format memory 8 (step A7).

Figure 9:
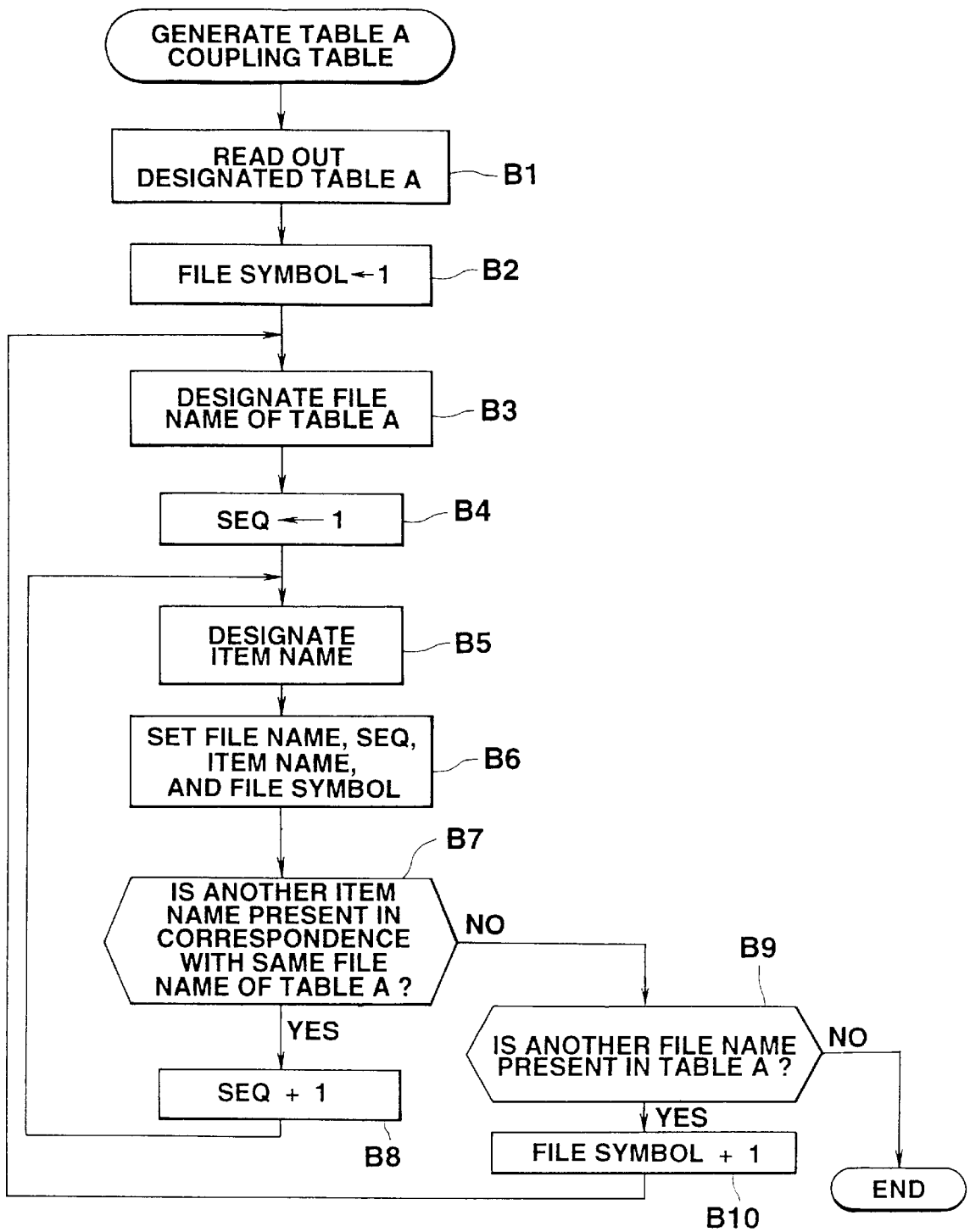
FIG. 9 is a flow chart showing the details of table A coupling table generation processing shown in FIG. 8.

FIG. 9 is a flow chart showing generation processing of the table A coupling table. The table structure analysis unit 5 analyzes the index portions in the column direction of the table A, and generates the table A coupling table, as shown in FIG. 5A. Note that the table A coupling table is a correspondence table for causing the file names and item names, defined in the table A, to correspond to each other, and consists of; "file name", "sequential number SEQ", "item name", and "file symbol". In this case, "sequential number SEQ" is a code for specifying item names, defined in a single file, by serial numbers from "01", and "file symbol" is a code for specifying files, defined in the table A, by serial numbers from "1".

The table structure analysis unit 5 reads out the table A parameter data of the designated accounting form from the parameter file 4 (step B1), and designates an initial value "1" as the file symbol (step B2). Then, the unit 5 sequentially analyzes the index portions in the column direction of the table A from the start one. More specifically, the table structure analysis unit 5 designates a start file name defined in the table A (step B3); designates an initial value "1" of the sequential number SEQ (step B4), and designates a first item name corresponding to the start file name (step B5); thereby writing the designated file name, sequential number SEQ, item name and file symbol in the table A coupling table (step B6). In this case, as in table A; shown in FIG. 3, data shown in FIG. 5A are written in the first row of the table A coupling table. Then, if another item name is defined in correspondence with a single file name (step B7); the value of the sequential number SEQ is updated by adding "1" (step B8), the next item name is designated (step B5), and the designated data are written in the table A coupling table (step B6). Thereafter, the above-mentioned operations are repeated until all the item names corresponding to a single file name are designated. As a result, when all the item names are designated, the flow advances to step B9, and if another file name is present in the table A, the value of the file symbol is updated by adding "1" accordingly (step B10). Thereafter, the flow returns to step B3, the corresponding file name is designated from table A, and all item names corresponding to the designated file name are sequentially designated and written in the table A coupling table.

The generation processing (step A2) of the configuration file 7 shown in FIG. 8 will be described in detail below with reference to FIGS. 10 to 14.

Figure 10:
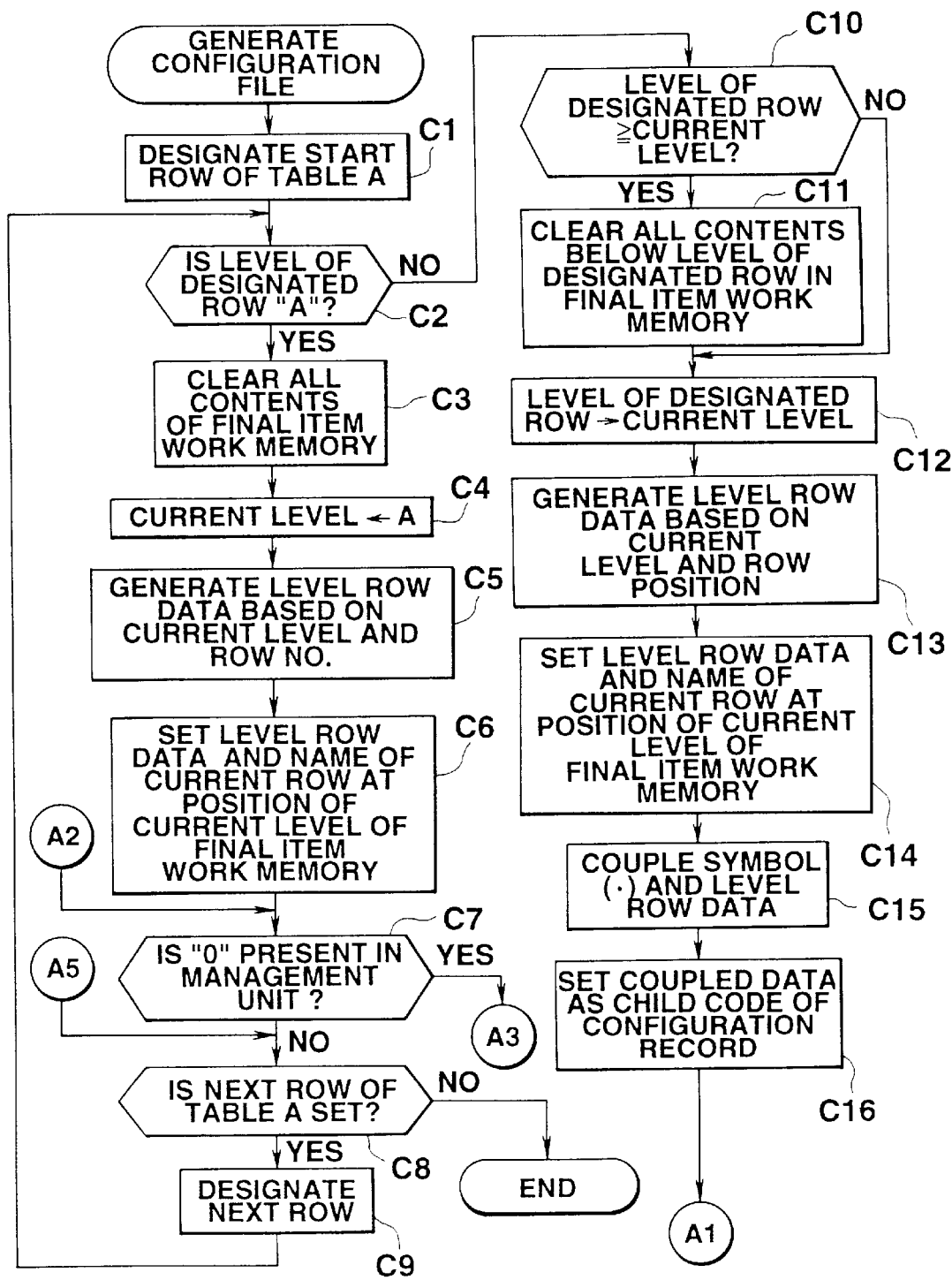
FIG. 10 is a flow chart showing the details of a portion of configuration file generation processing shown in FIG. 8.
Figure 11:
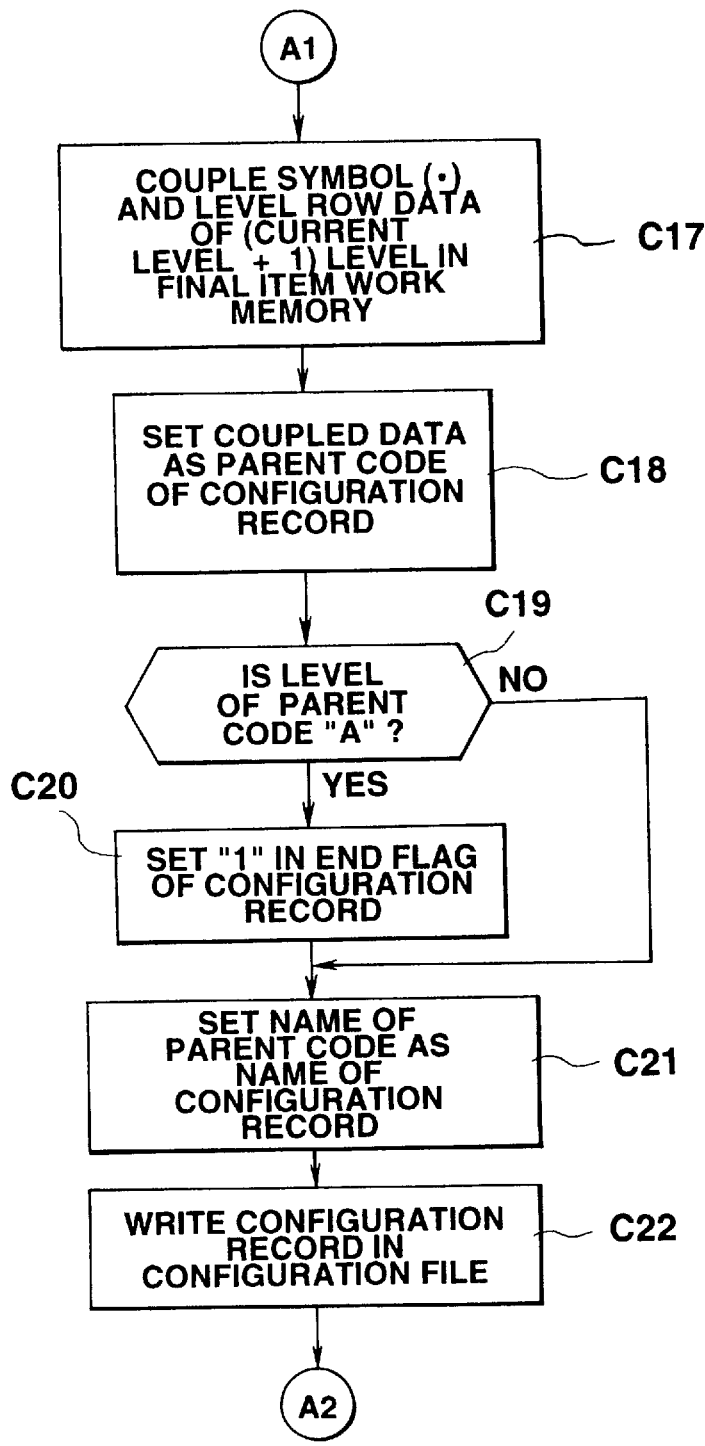
FIG. 11 is a flow chart showing the details of another portion of the configuration file generation processing following FIG. 10.
Figure 12:
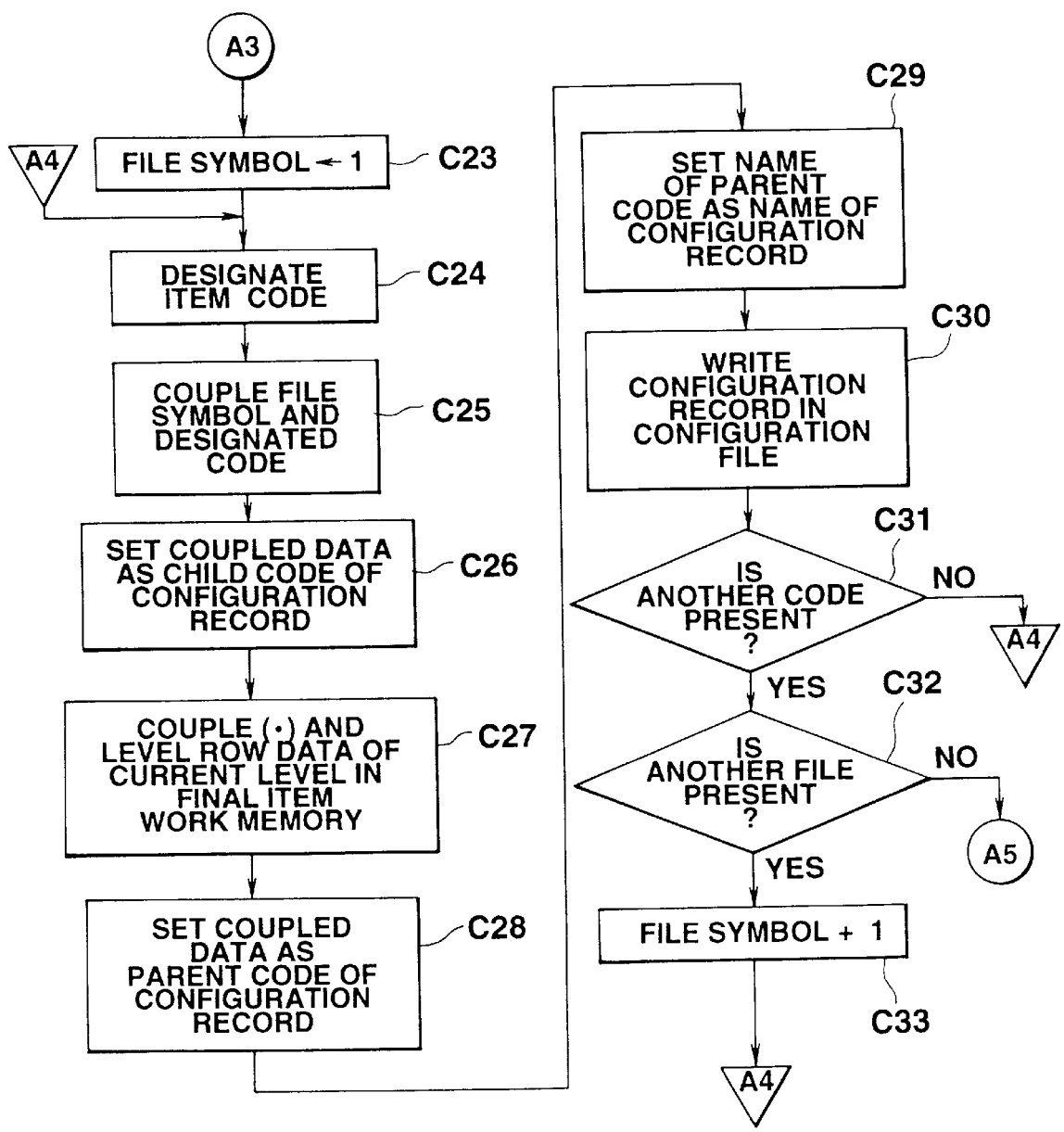
FIG. 12 is a flow chart showing the details of still another portion of the configuration file generation processing following FIG. 10.
Figure 15:
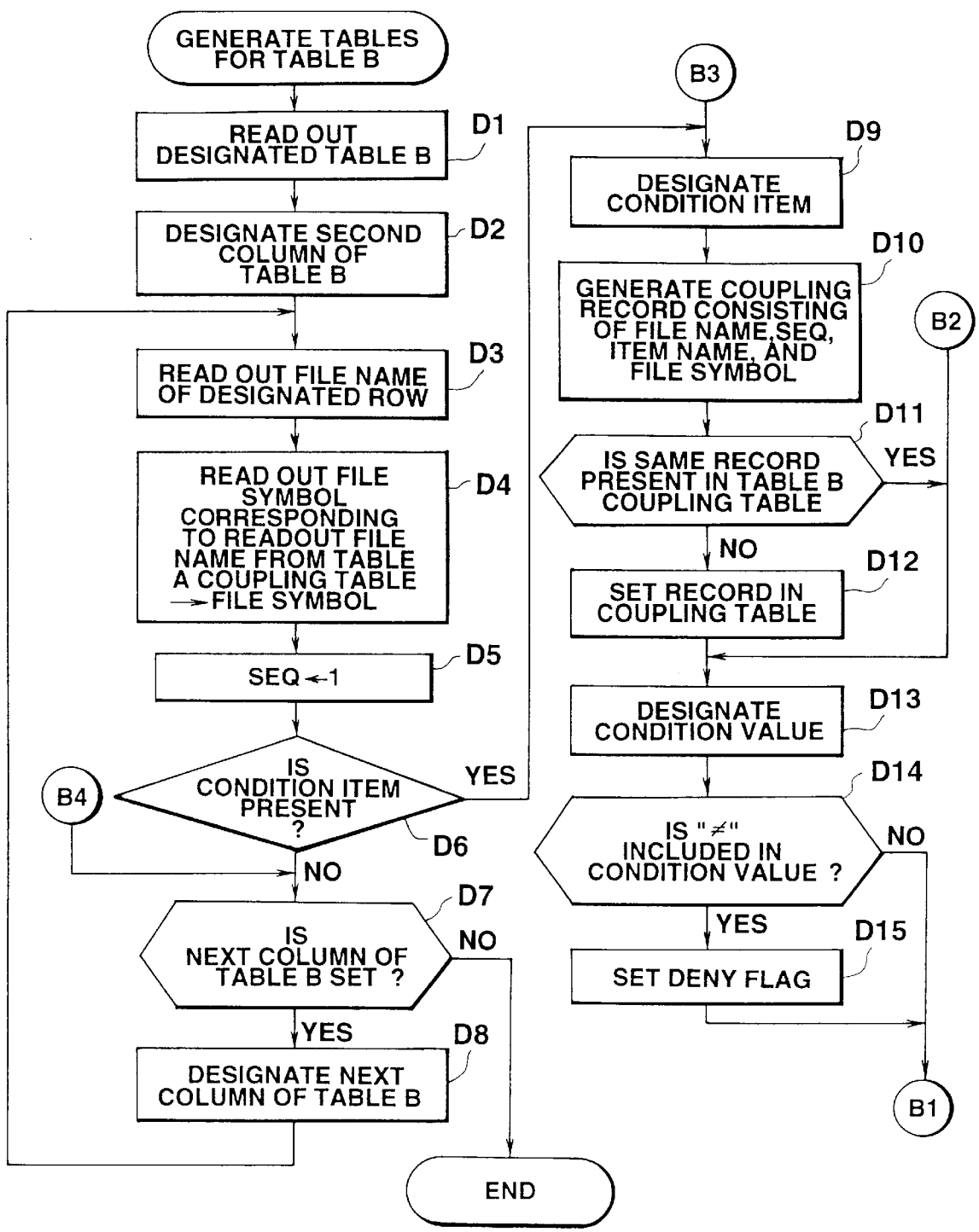
FIG. 15 is a flow chart showing a portion of table generation processing associated with the table B shown in FIG. 8.
Figure 16:
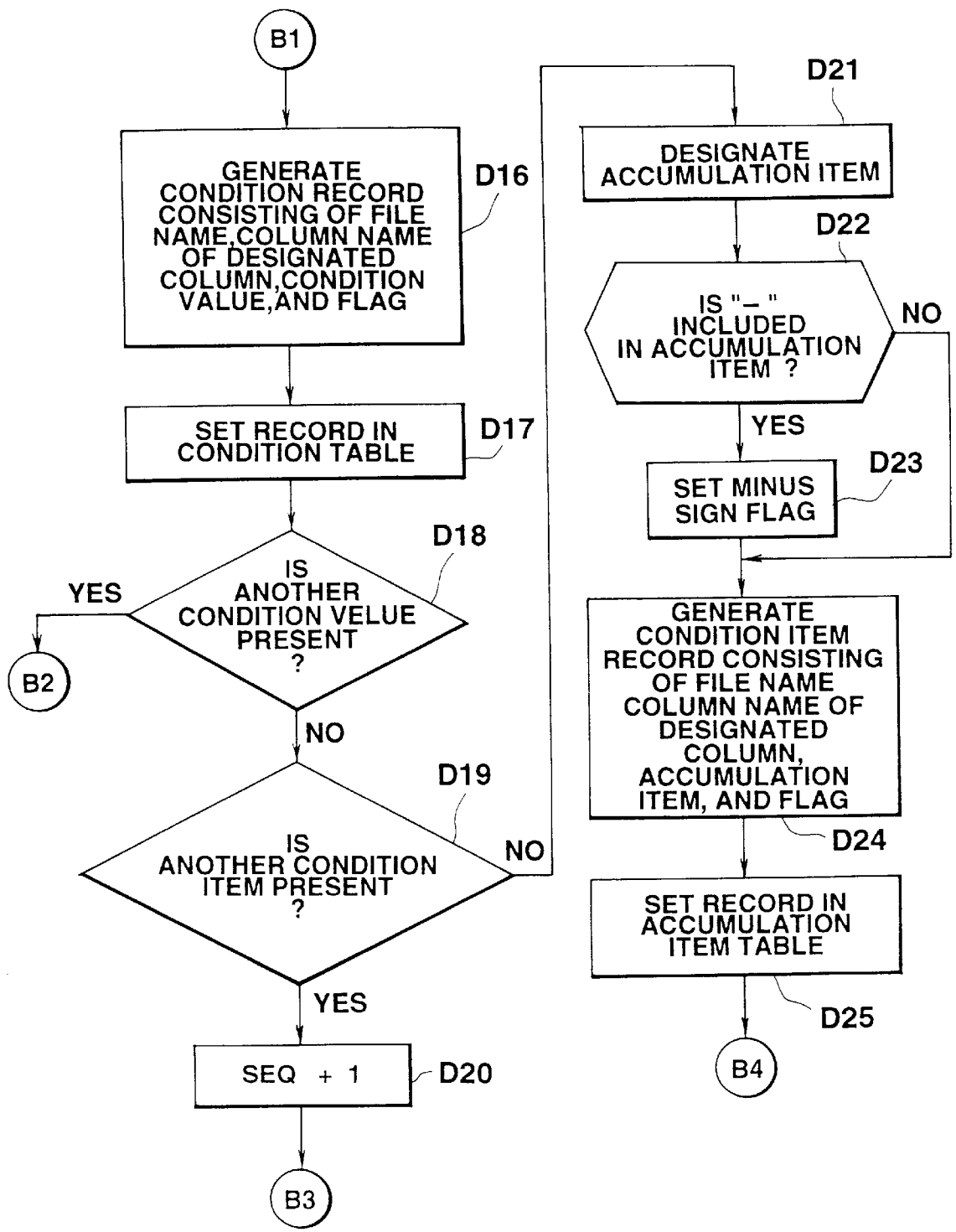
FIG. 16 is a flow chart showing another portion of the table generation processing following FIG. 15.
Figure 17:
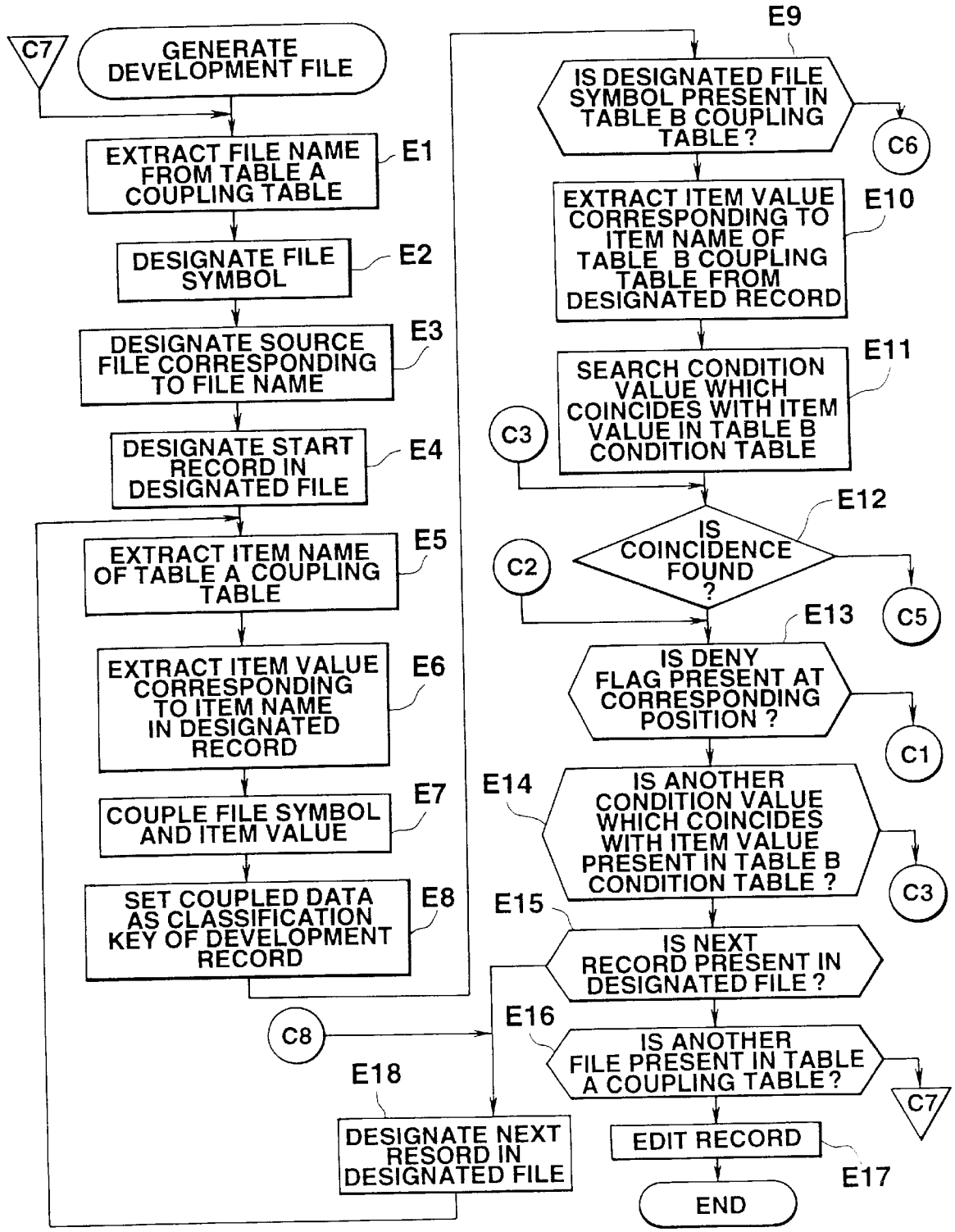
FIG. 17 is a flow chart showing a portion of development file generation processing.
Figure 18:
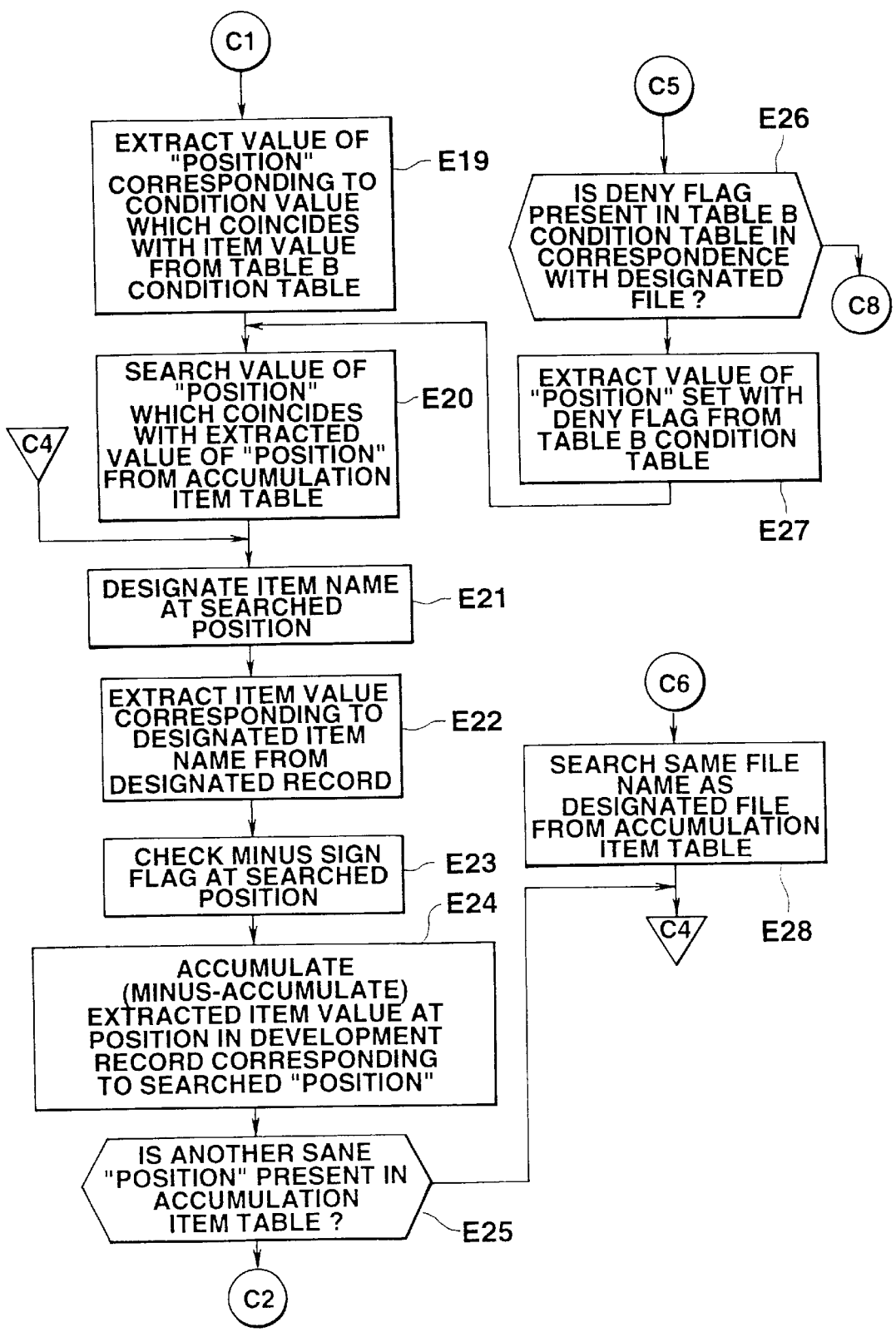
FIG. 18 is a flow chart showing another portion of the development file generation processing following FIG. 17.
Figure 22:
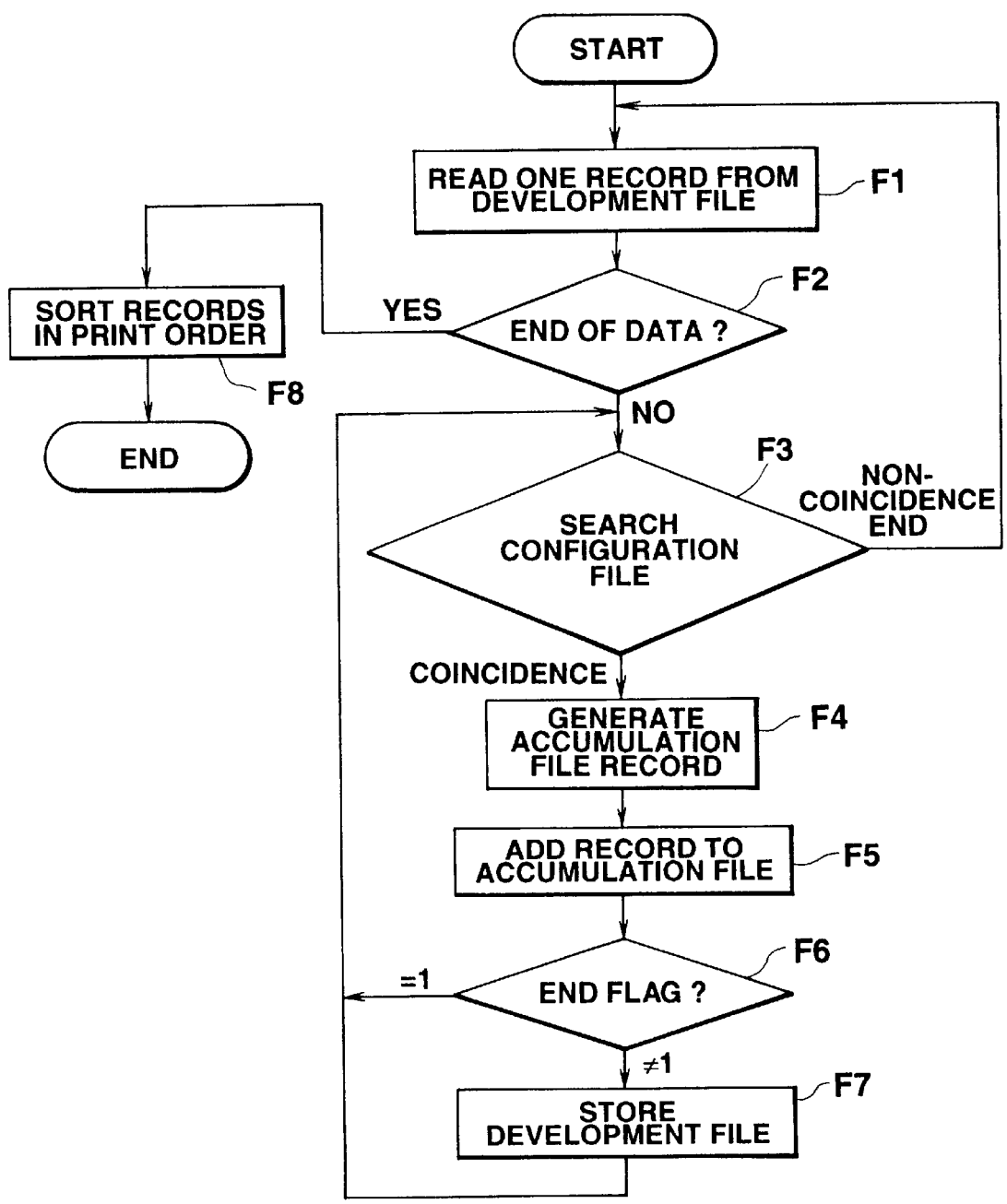
FIG. 22 is a flow chart showing development accumulation processing by a development accumulation processing unit 12.

FIGS. 10 to 12 are flow charts showing operations upon generation of the configuration file 7, FIGS. 13A to 13C illustrate operation contents of the table structure analysis unit 5 in this case, and FIG. 14 shows the generated configuration file 7. Note that FIG. 13A shows the record structure of the configuration file 7. This configuration record consists of "child code"; "parent code", "end flag"; and "name"; and, "child code" and "master code" represent the hierarchical structure of the table A. "end flag" is a flag which is set to be "1" when the parent code includes the accumulation level A. "name" is a record name of an accumulation record defined in the table A.

First, the table structure analysis unit 5 designates the start row of the table A parameters (step C1), and checks if the accumulation level of the designated row is the highest-order level A (step C2). If the accumulation level is A, all the contents of a final item work memory (see FIG. 13B) in the table structure analysis unit 5 are cleared (step C3), and the accumulation level A is designated as the level of interest (current level) (step C4).

In this state, level row data is generated based on the current level and the row of interest (current row) (step C5). For example; in the case of the table A shown in FIG. 3, since the start row of the table A corresponds to the accumulation level A, and its row No. is "01", level row data "A01", as a combination of the current level and row No., is generated. Then, the level row data "A01" and the name of the current row (i.e., the record name "total", of the accumulation record) are set at positions corresponding to the current level A in the final item work memory (step C6). Note that the final item work memory stores level row data and names in correspondence with the accumulation levels A, B, C, D, . . . , as shown in FIG. 13B.

Then, it is checked if a circular mark has been assigned to the management unit area of the current row (step C7). In this case, since no circular mark has been assigned to the start row, as shown in FIG. 3, it is checked whether a record name is set in the next row of the table A (step C8). If it is determined that a record name is set; the current row is updated, and the next row is designated (step C9). When the second row of the table A is designated, the flow returns to step C2. In this case, since the accumulation level of the second row is B, the flow advances to step C10, and an error check operation is performed, i.e., it is checked whether the level of the designated row exceeds the current level. If it is determined that the level of the designated row exceeds the current level; all the contents below the level of the designated row in the final item memory are cleared (step C11).

In this case, since the designated row level B is below the current level A, the flow advances to step C12, and the current level is updated by setting the designated row level to be the current level. Then, level row data is generated based on the current level and the row No. of the current level (step C13), and the level row data, and the name of the current row are set at positions corresponding to the current level of the final item work memory (step C14). In this case, level row data "B02" and the name "fixed expense" are set at the positions corresponding to the current level B (see FIG. 13B). Then, a symbol (•) is coupled to the start of the level row data (step C15), and the coupled data is set to be a child code of the configuration record, as shown in FIG. 13A (step C16). Note that the symbol (•) is set when a row of table A in which no item code is input, is determined as the row of interest, and indicates that there is no correspondence with the source file. The flow then advances to step C17 in FIG. 11. In step C17, level row data stored at a level position of (current level +1) is read out from the final item work memory, the symbol (•) is coupled to the start of the level row data, and the coupled code is set to be a parent code of the configuration record (step C18). In this case, since the current level is B, the coupled code, obtained by coupling the symbol (•) to the level row data "A01" stored at the position of the level A in the final item work memory, serves as the parent code (see FIG. 13A). If the level of the parent code is A (step C19), "1" is set in the end flag of the configuration record (step C20). The name of the parent code is read out from the final item work memory, and is set as the name of the configuration record (step C21). In this manner, when the child code "•C03", the parent code "•B02", and the name "fixed expense" are determined, this configuration record is written in the configuration file 7 (step C22).

The flow then returns to step C7 in FIG. 10. In this case, since no circular mark has been assigned to the management unit area of the current row, the next row, i.e., the third row, is designated (step C9). Thereafter, since the above-mentioned steps C12 to C14 are executed, level row data "C03" and the name "personnel expense" of the current row are set at the level C of the final item work memory (see FIG. 13B). A coupled code obtained by adding the symbol (•) to this level row data is set as a child code of the configuration record (steps C15 and C16). Then, coupled code; obtained by adding the symbol (•) to level row data "B02" read out from the position of the level B (the level position higher by one level) in the final item work memory, is set as a parent code of the configuration record (steps C17 and C18 in FIG. 11). In this case, the name "fixed expense" in the final item work memory corresponding to the parent code becomes the name of the configuration record (step C21). In this manner, when the child code "•C03", the parent code "•B02", and the name "fixed expense" are prepared as data for one record, this configuration record is stored in the configuration file 7 (step C22).

Subsequently, if it is detected in step C7 in FIG. 10 that a circular mark has been assigned to the management unit area of the third row, the flow advances to step C23 in FIG. 12, and "1" is set to be an initial value of the file symbol. Then, an item code input to the current row is designated from the start one (step C24), the file symbol and the item code are coupled to each other, and the coupled code is set as a child code of the configuration record (steps C25 and C26). In this case, since a file symbol "1" and an item code "101" are coupled to each other, a child code "1101" is generated. The symbol (•) is coupled to the start of level row data of the current level in the final item work memory (step C27), and the coupled data is set to be a parent code of the configuration record (step C28). The name "personnel expense", belonging to this parent code, is read out from the final item work memory, and is set as the name of the configuration record (step C29). FIG. 13C shows the configuration record in this case; the configuration record consisting of the child code "1101", the parent code "•C03", and the name "personnel expense" is written in the configuration file 7 (step C30). Then, it is checked if another item code has been input to the current row (step C31). If another code is present, the flow returns to step C24, the next item code is designated, and thereafter, the above-mentioned operations are repeated. As a result, the configuration record, obtained when an item code "102" in the third row is designated, consists of a child code "1102", a parent code "•C03", and a name "personnel expense".

Thereafter, since the absence of an item code is detected in step C31, the flow advances to step C32, and it is checked if another file name is defined in table A. In this case, since "accounting file" is defined as the next file name in the table A, the flow advances to step C33, and the value of the file symbol is updated by adding "1". Thereafter, the flow returns to step C24. In this case, since a file symbol "2" and a first item code "2111" are designated, the child code of the configuration record is "22111", the parent code is "•C03", and the name is "personnel expense".

If the absence of another file is detected in step C32, the flow returns to step C8 in FIG. 10. Thereafter, processing for generating a configuration record, and writing the generated record in the configuration file 7 is repeated in units of records, until it is determined in step C8 that no more record name is set. With this processing, the configuration file 7 shown in FIG. 14 is generated. The content of the configuration file 7 is generated by referring to table A shown in FIG. 3, the 8th to 12th records of the configuration file 7 correspond to row No. "03" of table A, and the 13th to 15th records correspond to row No. "04" of table A.

Upon completion of generation of the configuration file 7, the table structure analysis unit 5 generates the table B coupling table, the condition table, the accumulation item table, and the calculation formula table. Of these tables; the table B coupling table, the condition table, and the accumulation item table are generated according to the flow charts shown in FIGS. 15 and 16.

The table B coupling table (see FIG. 5B) consists of "file name", "sequential number SEQ", "item name" of condition items, and "file symbol". The condition table (see FIG. 5C) consists of "file name", "item position of table B", "condition value", and "deny flag". Note that "deny flag" is a flag indicating that "≠ (not equal)" is set as the condition value. The accumulation item table (see FIG. 5D) consists of "file name", "item position of table B", "item name" of accumulation items, and "minus sign". Note that "minus sign" indicates that a minus sign is added to the item name of the accumulation item like "credit amount–".

The table structure analysis unit 5 reads out the table B parameter data of the designated accounting form from the parameter file 4 (step D1), and designates the second column (item position B) (step D2). Then, the object file name of the designated column is read out (step D3), and a file symbol corresponding to this file name is read out from the table A coupling table (step D4). In step D5, the sequential number SEQ is set to be an initial value "1", and it is then checked if an item name has been set in a condition item of the designated column (step D6). If an item name is set, the condition item name is designated (step D9). A coupling record is generated based on the file name, the sequential number SEQ, the condition item name, and the file symbol which are obtained, as described above (step D10), and thereafter, is set in the table B coupling table. In this case, in order to avoid repetitive setting of a single record, only when it has been determined that the same record is not set in the table B coupling table (step D11), will the generated coupling record be set in the table B coupling table (step D12).

Then, a condition value of the designated column is designated (step D13), and if "≠" is added to this condition value (step D14), the deny flag will be set (step D15). A condition record is generated based on the file name; the column name indicating the item position of the designated column, the condition value, and the deny flag, which are obtained as described above (step D16); and is then set in the table B condition table (step D17). In this case, when a plurality of condition values are set in the designated column, since the condition record is generated in correspondence with each condition value, it is checked, in step D18, whether another condition value is present. If another condition value is present, the flow returns to step D13, the next condition value is designated, and a condition record corresponding thereto is generated and is set in the condition table.

It is then checked in step D19 whether another condition item is present in the designated column. If another condition item is present, the flow advances to step D20, and the value of the sequential number SEQ is updated by adding "1". The flow then returns to step D9, and the next condition item is designated. Thereafter, a coupling record and a condition record corresponding to the next condition item are generated, and are set in the corresponding tables.

If the absence of another condition item is detected in step D19, the flow advances to step D21, andn the condition item of the designated column is designated. If a minus sign is added to the designated condition item (step D22), the minus sign flag is set (step D23). An accumulation item record is generated based on the file name; the column name indicating the column item position of the designated column, the accumulation item, and the minus sign flag, which are obtained as described above (step D24); and is then set in the accumulation item table (step D25).

After the definition contents for one column of the table B are analyzed, and the table B coupling table, the condition table, and the accumulation item table for one column are generated; the flow advances to step D7 to check whether data has been designated in the next column of the table B. If data has been designated in the next column, the column is designated (step D8) and thereafter, the flow returns to step D3, to repeat the above-mentioned operation.

In addition to the above-mentioned tables, the table structure analysis unit 5 generates the calculation formula table by analyzing the table B parameter data. In this calculation formula table, calculation formulas are made to correspond to the column item positions. Also, the table structure analysis unit 5 reads out format data from the table B parameter data in correspondence with the column item position, and sets the readout data in the print format memory 8.

Up on completion of the above-mentioned table generation processing, the table structure analysis unit 5 starts the development file generation unit 9. Then, the development file generation unit 9 executes development file generation processing according to the flow charts shown in FIGS. 17 and 18. Note that the development file 11 is an intermediate file generated, before the accumulation file 13, as output data of an accounting form is generated. FIG. 19 shows development records generated according to the contents of the first to fourth records when the source file is a plan file, and FIG. 20 shows development records generated according to the contents of the first to third records when the source file is an accounting file. Furthermore, FIG. 21 shows the content of the generated development file 11 based on these records. Assume that various tables shown in FIGS. 5A to 5D are set in the parameter analysis table 6.

The development file generation unit 9 refers to the parameter analysis table 6 to extract a file name (the file name of the first record at the beginning of the processing) from the table A coupling table (step E1), and designates the file symbol of the extracted file name (step E2). Then, the unit 9 designates a source file corresponding to the extracted file name (step E3), and designates the start record in the designated source file (step E4). Thus, the start record of "plan file" defined at the start position of table A as the accumulation object file is designated. Unit 9 then extracts an item name (the item name of the first record at the beginning of the processing) from the table A coupling table (step E5), and extracts an item value corresponding to the extracted item name from the designated record (the first record at the beginning of the processing) in the designated file (step E6). The unit 9 couples the item value and the designated file symbol (step E7), and sets the coupled data as a classification key of a development record (step E8). In this case, as shown in FIG. 19, an item value "101" of the budget item is extracted from the first record of the plan file, the item value "101" and the designated file symbol "1" are coupled, and the coupled data "1101" serves as a classification key in the first record of the development record.

Then, it is checked whether the output object item is a record matching an extraction condition defined in table B in the start record of this plan file. More specifically, the development file generation unit 9 refers to the table B coupling table to check if the designated file symbol is present in this table (step E9). In this case, when the condition item is defined in table B, as described above, since the file name; the condition item name, the file symbol, and so on are set in the table B coupling table, the fact that no file symbol is set means that no condition item is defined in the table B (i.e., a no-condition item for which no extraction condition of the output object item is set). In this case, since the designated file symbol "1" is set in the table B coupling table, the flow advances to step E10 to extract the item value, corresponding to the item name of the table B coupling table, from the designated record. In this case, the item value "1" of the plan type is extracted from the start record. A condition value corresponding to this item value is searched from the table B condition table (step E11) to check if a coinciding condition value is present (step E12). In this case, since the item value "1" of the plan type included in the start record is present, in the first record in the table B condition table, the flow advances to step E13 to check whether the deny flag has been set in the corresponding table B condition table. In this case, since no deny flag has been set, the flow advances to step E19, a value (B, in this case), of a position corresponding to the coinciding condition value, is extracted from the table B condition table, a value of the item position coinciding with the extracted value is searched from the accumulation item table (step E20), and an item name corresponding to the searched value is designated (step E21). Since the item position B is set in the first record of the accumulation item table, the item name "budget amount" corresponding to this position is extracted, an item value "800,000" corresponding to this item name is extracted from the designated record (step E22), and it is checked whether the minus sign flag has been set in the accumulation item table in correspondence with this item position B (step E23). The flow then advances to step E24, and the item value "800,000" extracted from the designated record is accumulated at the corresponding position "B" of the development record. In this case, an item value set with the minus sign flag is subjected to a minus accumulation, and an item value set with no minus sign flag is subjected to a plus accumulation. Thus, the development record of the first record is generated, as shown in FIG. 19.

It is checked whether the same item position (B in this case) has been set in the accumulation item table (step E25). In this case, as shown in FIG. 5D; although each of the item positions D and E is set for two item names in the accumulation item table in correspondence with the item names "debit amount" and "credit amount" for the accounting file, since a plurality of item positions B are not set; the flow advances to step E14 to check if another condition value, which coincides with the item value, is present in the table B condition table. Since the condition value "1" is present in only the first row in the table B condition table, the flow advances to step E15 to designate the next record under a condition that the next record is present in the designated plan file (step E18).

Thus, the second record of the plan file is designated, and the flow returns to step E5 to repeat the above-mentioned operations. In this case, a classification key "1102", of the development record for the second record, is generated; based on the file symbol "1" and a budget item value "102" of the second record (steps E5 to E8). As in the first record, since an item value corresponding to the plan type of the second record is "1", a condition value which coincides with the item value "1" is present in the table B condition table, and no deny flag is set in correspondence therewith, the flow advances to step E19 to extract the item position "B" from the table B condition table, and the item name "budget amount" corresponding to the item position "B" is extracted from the second record of the plan file (steps E20 to E22). In this case, as shown in FIG. 19, the item value "200,000" is extracted from the item of the budget amount of the second record of the plan file, and is plus-accumulated at the corresponding position "B" of the development record (second record) (step E24).

When the third record of the plan file is designated (step E18), a classification key "1103" of the development record (third record) is generated. In this case, the item value of the plan type of the third record read out from the plan file is "2", and the condition value which coincides with this item value is set in the table B condition table. However, the item value which coincides with this condition value is "C". Therefore, an item value "400,000" of "budget amount", extracted from the third record of the plan file, is plus-accumulated at the corresponding position "C" in the development record (third record).

Furthermore, when the fourth record of the plan file is designated, an item value "50,000" of the budget amount, extracted from the fourth record of the plan file, is plus-accumulated at the item position "C" of the development record (fourth record) as in the third record. Note that the classification key of this development record is "1104".

Thereafter, the development records of the plan file are sequentially generated one by one with reference to the table A coupling table, the table B coupling table, the condition table, and the accumulation item table while sequentially designating each record of the plan file.

When it is detected in step E9 that no designated file symbol is set in the table B coupling table, since the corresponding item is a no-condition item for which a condition item is not defined, the flow advances to step E28, and the same file name as the designated file is directly searched from the accumulation item table without referring to the definition content of the table B condition table. Thereafter, the flow returns to step E21.

As a result of the above-mentioned operations for each record, when all the records in the designated file are designated, and when it has been detected in step E15 that no record remains, the flow advances to step E16 to check if another file is defined in the table A coupling table. In this case, since the accounting file is defined as another file in the table A coupling table, the flow returns to step E1 to execute processing for sequentially generating development records in correspondence with the accounting file.

More specifically, "accounting file" is extracted as a file name from the table A coupling table (step E1), and "2" is designated to be the file symbol of the extracted file name (step E2). The accounting file is designated to be a source file corresponding to this file name (step E3), and its start record is designated (step E4).

In this state, an item value "2111" of "account item" of the designated record is coupled to the file symbol "2" to generate a classification key "22111" of the development record for the first record (steps E5 to E8). The flow then advances to step E9. In this case, since the file symbol "2" is stored in the table B coupling table, an item value corresponding to the item name "corresponding account" of the table B coupling table is extracted from the first record of the accounting file (step E10). Since "0011" is extracted as an item value of "corresponding account" from the first record of the accounting file, a condition value which coincides with this item value is searched from the table B condition table (step E11). In this case, since the corresponding condition values are set in the fifth and sixth rows of the table, a coincidence is detected in step E12, and the flow advances to step E13. First, it is checked if the deny flag has been set at a position corresponding to the fifth row. In this case, since the deny flag is set in the fifth row of the table B condition table, the flow advances to step E14 to check if another condition value which coincides with this item value "0011" is present in the table B condition table. In this case, since the condition value "0011" is present in the sixth row of the table B condition table, the flow returns to step E13. Since no deny flag has been set at a position corresponding to this condition value, the flow advances to step E19 to extract an item position "E" corresponding to the condition value, and an item name in the accumulation item table, which coincides with the item position "E", is designated (steps E20 and E21). In this case, an item name; "debit amount" corresponding to the first item position of the item positions "E", respectively set in the fifth and sixth rows of the accumulation item table, (i.e.; the fifth row), is designated. Then, an item value "50,000" corresponding to the designated item name is extracted from the first record of the accounting file, and is plus-accumulated at the corresponding position "E" of the development record for the first record of the accounting file (steps E22 to E24).

The flow then advances to step E25. In this case, since the same item position "E" is present in the sixth row in addition to the fifth row in the accumulation item table, the flow returns to step E21 to designate an item name "credit amount" corresponding to this item position in the accumulation item table, and an item value corresponding to this designated item name is extracted from the first record of the accounting file (step E22). In this case, "D" is extracted as the item value of the credit amount from the first record of the accounting file, and is accumulated at the corresponding position "E" of the first record of the development record. In this case, since the minus sign flag is set in the sixth row of the column item table, a minus accumulation, (i.e.; "the previous debit amount "50,000"–the current credit amount "0") is calculated (step E24). Thereafter, the flow advances to step E18 via steps E25, E14 and E15 to designate the second record of the accounting file.

Then, the development record is generated in correspondence with the second record of the accounting file. In this case, the item value of the account title is also "2111" and the classification key is "22111" as in the first record. Since the corresponding account of the second record is also "0011", and coincides with the item condition value, its debit amount "0" is plus-accumulated at the item position E of the development record, and its credit amount "40,000" is minus-accumulated at the item position E. For this reason, "–40,000" is written at the item position of the development record for the second record.

The third record of the accounting file is then designated. Since the item value of the corresponding account is "0011"; and no condition value, which coincides with this item value, is set in the table B condition table, the flow advances from step E12 to step E26 to check whether the deny flag has been set in the table B coupling table in correspondence with the designated file. In this case, since the deny flag has been set in the fifth row of the table B condition table in correspondence with the accounting file; a value "D" at the position where the deny flag is set is extracted from the table B condition table, a position which coincides with this value is searched from the accumulation item table (step E20) to extract an item value "800,000" corresponding to the item name "debit amount" from the third record; and the extracted value is plus-accumulated at the corresponding position D of the development record. Thereafter, the flow returns from step E25 to step E21, and an item value "0" of the next item name "credit amount" is minus-accumulated at the position "D" of the development record in the same manner as described above. Thereafter, the next record is designated, and the same operations as described above are repeated for each record every time a non-coincidence is detected in step E12. Thus, development records according to the condition value "≠0011" of the condition item "corresponding account" are sequentially generated.

Thereafter, when all the records of the accounting file are designated, and it is detected in step E15 that no next record is present, the flow advances to step E16 to check if another file is present in the table A coupling table. In this case, since it has been detected that no file remains, the flow advances to step E17 to execute edit processing of the development records. More specifically, the development records having the same classification key are extracted, and are combined into a single record. In addition, the development records are sorted in ascending order in accordance with the classification keys. For example, as shown in FIG. 20, since the development records of the first and second records have the same classification key, they are combined into a single development record, and the value of its item position "E" becomes "10,000".

FIG. 21 shows the content of the development file 11 which is generated, as described above. More specifically, the development file 11 is generated according to the contents of the plan file and the accounting file, its record structure has items A, B, C, D, E and F, and its start item A includes classification keys.

After the development file generation unit 9 generates the development file 11 in this manner, it starts the development accumulation processing unit 12. Then, the development accumulation processing unit 12 generates the accumulation file 13 in accordance with the flow chart shown in FIG. 22. Note that FIGS. 23A and 23B are views for explaining the operation contents of the development accumulation processing unit 12 in detail.

The development file generation unit 9 generates the accumulation file 13 on the basis of the contents of the development file 11 and the configuration file 7 in accordance with a parts development method.

The development accumulation processing unit 12 reads data for one record from the start record of the development file (step F1). It is then checked in step F2 if the end of data is detected (i.e., if all the records are read out from the start record of the development file 11). Initially, since data for one record are read from the start record of the development file 11, the flow advances to step F3 to search the content of the configuration file 7; thereby acquiring a child code which coincides with the classification key. In this case, as shown in FIG. 23A; since the classification key in the start record of the development file 11 is "1101", and a child code which coincides with this key is present in the configuration file 7, as shown in FIG. 14; the presence of the child code is detected in step F3, and the flow advances to step F4 to generate a record (accumulation record) of the accumulation file 13. More specifically, in the example shown in FIGS. 23A and 23B, the development accumulation processing unit 12 reads out the parent code corresponding to this child code "1101" from the configuration file 7; separates the parent code "•C03" into row No. "03" of the table B, and the remaining code "•C"; arranges row No. "03" in the start item of the first record of the accumulation file 13, and also arranges the remaining code "•C" after the row No. Unit 12 then reads out a name corresponding to this child code from the configuration file 7, and arranges the readout code as the next item of the accumulation record. The unit 12 sequentially arranges data items of the development file 11 in the next item and the subsequent items.

When data for one record of the accumulation file 13 are generated, the generated record is written in the accumulation file 13. In this case, if a record having the same classification key has already been present in the accumulation file 13, these records are accumulated as one record, and the accumulated record is written in the accumulation file 13. On the other hand, if no record having the same classification key is present in the file 13; the currently generated record is added to the accumulation file 13 (step F5).

It is checked whether the end flag has been set at the corresponding record position in the configuration file 7 (step F6). In this case, the end flag in the configuration file 7 is set to be "1" when the accumulation level of the parent code is "A". If the end flag is "1", the flow directly returns to step F3; if the end flag is not "1", a record is written in the development file 11 (step F7). In this case, a record, as shown in FIG. 23B, is generated, and is returned to the development file 11. More specifically, a record, in which the corresponding parent code "•C03" in the configuration file 7 is arranged in the start item, and data read out from the development file 11 are sequentially arranged after the parent code; is written in the development file 11. Note that, in the development file 11 shown in FIG. 21, a record arranged below a broken line in FIG. 21 represents the returned record.

Thereafter, the flow returns to step F3 to search all the contents of the configuration file 7, and the above-mentioned operations are repeated until no record is detected. As a result, if it is detected in step F3 that no record remains, and the non-coincidence end is determined, the flow returns to step F1 to read out the next record from the development file 11. Such operations are performed for all the records in the development file 11. Thus, the end of data is detected in step F1, and the flow advances to step F8. In step F8, the records constituting the accumulation file 13 are sorted in the ascending order in accordance with the contents of their start items.

When the accumulation file 13 is generated in this manner, the development accumulation processing unit 12 starts the print processing unit 14. The print processing unit 14 fetches the content of the print format memory 8, and causes the printer 15 to print out the content of the accumulation file 13 together with the accounting form format in accordance with the fetched print format. In this case, the record names stored in the accumulation records of the accumulation file 13 are sequentially extracted, and are arranged in the vertical direction. In addition, the item names stored in the print format memory 8 are sequentially extracted, and are printed out at the corresponding positions of the accounting form format. FIG. 2 shows an example of the printed accounting form in this case. In this accounting form, the record names of the accumulation records are printed in the row direction together with the hierarchical structure format according to the accumulation levels, the item names of the accumulation records are printed in the column direction, and the contents of the accumulation file 13 are printed out in units of records.

As described above, according to this embodiment, when an office clerk arbitrarily defines tables A and B as accumulation definition tables, according to an output image of a desired accounting form; so as to obtain the accounting form, the contents of arbitrary record items are read out from the designated files in accordance with the definition contents and then classified and accumulated. In addition, the accumulation result is printed in a hierarchical structure. Therefore, even an office clerk can easily obtain a desired accounting form.

In the above embodiment, record accumulation is performed. However, when the accumulation level of the table A is limited to only A; record extraction, arrangement, intra-item calculation and the like may be simply performed in addition to the record accumulation.

In the above embodiment, an accounting form is printed out, but may be displayed on a CRT screen or may be output to other media.

In the above embodiment, the tables A and B are independently defined. However, the tables A and B may be simultaneously defined on a single screen.

In the above embodiment, an item code is input at an arbitrary crossing position on a matrix defined by index portions of table A. However, an item name may be input. Also, a record name of an accumulation record input in the row direction of table A is input in a hierarchical structure in correspondence with the accumulation level. However, the present invention is not limited to the hierarchical structure. FIG. 24 shows another embodiment of the table A. Referring to FIG. 24, as accumulation levels; codes A, B and C are assigned in correspondence with accumulation records in order, starting with higher accumulation levels, and item names and their condition values (item codes) are caused to correspond to accumulation records. When a plurality of item names must be designated in a single file, the number of columns of item names and condition values need only be increased. When the images of the tables A and B themselves are printed, based on a parameter file; such printed images may be stored as a sample of an accounting form in a form which is easy for an office clerk to understand.

Figure 25:
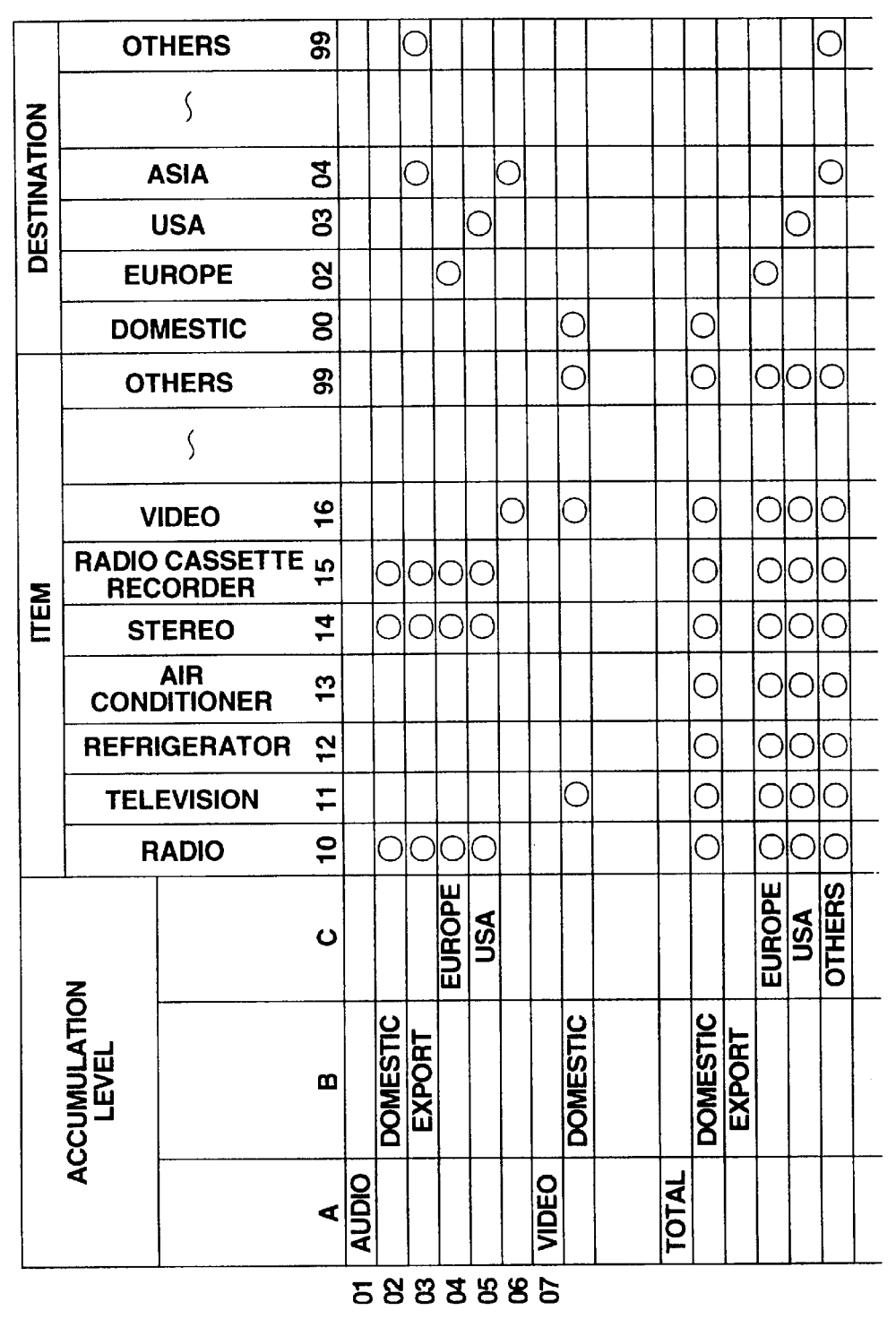

FIG. 25 shows still another embodiment of table A. That is; FIG. 25 shows the display state of the basic format, and the display state of parameter data input based on the display of the basic format. An arbitrary name is input to an index portion of each row of table A as a record name of an accumulation record in correspondence with each accumulation level. For example, a record name: "audio" is input to row No. "01" in correspondence with the accumulation level A, a record name: "domestic" is input to row No. "02" in correspondence with the accumulation level B, and record names shown in FIG. 25 are input and defined in the following rows in correspondence with the accumulation levels. Note that no record name is written in row No. "06" for a reason to be described later. Item names "item" and "destination" indicating fields of records in a specific file are input and defined in index portions of the columns of the table A. In this case, "accounting file" is assumed to be the specific file. The file name of this file may be input and defined in a column above the item names "item" and "destination" or in another column of the table A, or may be designated and defined independently of the table A. In the following description, the illustration of the designation state of the file name will be omitted.

An operator sequentially designates arbitrary crossing points on a matrix defined by index portions of the table A as accumulation objects using the input unit 1. In this case, a symbol (circular mark); shown in FIG. 25, is displayed at the position designated as the accumulation object. For example, as for row No. "02", (i.e., the record name "domestic" corresponding to the accumulation level B), circular marks are displayed at the positions of data names "radio", "stereo" and "radio cassette recorder" of the items to indicate that these data names are designated as accumulation objects. In addition, a circular mark is displayed at the position of a data name "domestic" of the destination to indicate that the data name is designated as an accumulation object.

As in row No. "02", when a plurality of data names "radio", "stereo" and "radio cassette recorder" are designated as a single item, and the data name "domestic" in another item is designated as well, this acts to accumulate records corresponding to an OR condition of the data names in the single item, and at the same time, includes data names corresponding to an AND condition of the data names between the items. As described above, no record name is written in row No. "06". In this case, since circular marks are displayed in a data name "video" of the item and a data name "Asia" of the destination; this acts that records including data names corresponding to their AND condition are those corresponding to the definition content of row No. "06", and that records corresponding to row No. "06" and records corresponding to the immediately preceding row No. "05" are to be totaled or ORed. More specifically, this case defines that a row where no record name is written is caused to correspond to the previous row where a record name is written, and the corresponding records in the respective rows are to be totaled.

Although the table B corresponding to the table A shown in FIG. 25 is not shown, item names to be printed out as data items of accumulation records, e.g.; "gross sales", "sales allowances"; "sales returns", "net sales amount", and "sales/returns ratio"; are input and defined in index portions of the respective columns of the table B. A description of the definition of the index portions of the rows of table B will be omitted since it is the same as that in the above embodiment.

Records having accumulation object items are extracted from the accounting file on the basis of the designated definitions of the table A, and are accumulated in units of record names. Furthermore, fields of the accumulated records are accumulated in correspondence with the data items defined by the designated definitions of table B. FIG. 26 shows a printed accounting form, which is accumulated as described above.

Still another embodiment of the table A will be described below with reference to FIG. 27. Note that other portions are the same as those in FIGS. 25 and 26, and a detailed description thereof will be omitted.

More specifically, in the table A shown in FIG. 25, an arbitrary crossing point on the matrix defined by index portions of the table A is designated as an accumulation object. However, in the table A shown in FIG. 27, although the index portions of the accumulation levels are arranged in the same manner as in FIG. 25, data names such as "radio", "television", and the like shown in FIG. 25 are not displayed. Instead, in this embodiment, code input areas for inputting item codes, destination codes and the like are arranged in correspondence with accumulation object items (e.g., "item" and "destination") in units of record names corresponding to the accumulation levels. More specifically, table A, shown in FIG. 27, has item code input areas, and destination code input areas.

In the code input areas arranged in table A, item codes or destination codes are input as accumulation objects in units of record names corresponding to the accumulation levels. Note that table A, shown in FIG. 27, shows a case wherein an item code "10" and a destination code "99" are input to the first row as accumulation objects, and item codes "10", "14" and "15", and a destination code "00"; are input to the second row as the accumulation objects. Even in this embodiment wherein codes are directly input to designate accumulation objects, the same accumulation processing as in the above embodiment is executed, and the print result of an accounting form has a hierarchical structure according to the accumulation levels.

Furthermore, the arrangement of table A is not limited to the above embodiments, but may be as those shown in FIGS. 28 to 30.

FIG. 28 shows a modification of the table A, and has a feature on its index portions of the accumulation levels. Other arrangements are the same as those in table A, shown in FIG. 25. More specifically, in table A, shown in FIG. 25, name input areas are arranged in correspondence with the accumulation levels A, B and C arranged in the column direction of the table A. However, in the table A shown in FIG. 28, a name input area for one column replaces the name input areas for three columns, and accumulation levels (indicated by numerals 1, 2, 3 and 4 in this case) are arranged in the row direction. When an office clerk sequentially inputs names while inputting and designating accumulation levels upon generation of table A, numerals representing the accumulation levels are displayed in table A to be offset in the column direction, in units of accumulation levels, and this "offset" represents the hierarchical structure of the accumulation levels. In this case, the hierarchical structure has a relationship of 1>2>3>4.

FIG. 29 shows another modification of table A. In this modification as well, table A has a feature on index portions of the accumulation levels. More specifically, table A shown in FIG. 29 also has a name input area for one column; and in this name input area, a bracketing ruled line format for dividing the accumulation levels A, B, C and D is displayed; thereby expressing the hierarchical structure of the accumulation levels. In this case, when an office clerk sequentially inputs names while inputting and designating the accumulation levels as in table A shown in FIG. 28; each input name is displayed together with the bracketing ruled line format according to the designated accumulation level.

FIG. 30 shows still another modification of table A. In this modification as well, table A has a feature on index portions of the accumulation levels. More specifically, names input in units of accumulation levels are hierarchically connected by a ruled line format, thereby expressing the hierarchical structure of the accumulation levels. In this case, when an office clerk sequentially inputs names while inputting and designating the accumulation levels, each input name is displayed together with the ruled line format according to the designation accumulation level.

Furthermore, the present invention is not limited to the above embodiments, and various other modifications may be made.

More specifically; in each of the above embodiments, when an arbitrary crossing position on the matrix defined by the index portions of table A is designated as an accumulation object; a circular mark is displayed at the corresponding position. For example; when an x mark is written at an arbitrary crossing position, crossing positions without x marks may be designated as accumulation objects.

Furthermore, the arrangement positions of the index portions in the row and column directions of the table A may be arbitrarily determined. For example, the index portions of items may be arranged in the row direction of table A.

Also, in the embodiment wherein codes such as item codes, destination codes, and the like are input as item data in table A, names such as; "television", "video", "domestic" and the like may be directly input.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing apparatus comprising:
   file storage means for storing files each having a plurality of records, each of said records including a plurality of items;
   first designation means for designating, on a first displayed array, (i) title of a plurality of output records to be output, (ii) an arrangement order of said plurality records to be output, (ii) an arrangement order of said plurality of output records, and (iii) files and items stored in said file storage means, so as to obtain an accounting form in which data stored in said file storage means is used;

second designation means for designating, on a second displayed array, (i) a plurality of output items contained in each of said plurality of output records designated by the first designation means, (ii) an arrangement order thereof, and (iii) definitions of calculations regarding item data of files designated by the first designation means so as to obtain data of each output item;

readout means for reading out designated item data from the files designated by the first designation means;

calculation means for calculating item data read out by said readout means, on the basis of the definitions of calculations designated by the second designation means; and output means for outputting an accounting form for each output record designated by the first designation means by assigning values obtained by said calculation means to each output item designated by the second designation means.

* * * * *

UNITED STATES PATENT AND TRADEMARK OFFICE
CERTIFICATE OF CORRECTION

PATENT NO.  : 5,805,881
DATED       : September 8, 1998
INVENTOR(S) : Kiuchi et al.

It is certified that error appears in the above-identified patent and that said Letters Patent is hereby corrected as shown below:

Column 20, last line, delete
          "(ii) an arrangement order of said plurality"

Column 21, line 1, delete "records to be output,"

Signed and Sealed this

Second Day of May, 2000

Attest:

Q. TODD DICKINSON

*Attesting Officer*     *Director of Patents and Trademarks*